(12) United States Patent
Whittemore et al.

(10) Patent No.: US 8,113,475 B2
(45) Date of Patent: Feb. 14, 2012

(54) ACCESSORY MOUNTING SYSTEMS

(75) Inventors: Jeffrey P. Whittemore, Arlington, MA (US); Michael D. Cattafe, Bolton, MA (US); Joshua A. Rose, Somerville, MA (US)

(73) Assignee: Zipwall, LLC, Arlington, MA (US)

( * ) Notice: Subject to any disclaimer, the term of this patent is extended or adjusted under 35 U.S.C. 154(b) by 0 days.

(21) Appl. No.: 12/760,118

(22) Filed: Apr. 14, 2010

(65) Prior Publication Data

US 2010/0237209 A1 Sep. 23, 2010

Related U.S. Application Data

(63) Continuation of application No. 11/415,624, filed on May 2, 2006, now Pat. No. 7,717,382.

(51) Int. Cl.
*F16B 1/00* (2006.01)
*G09F 7/18* (2006.01)

(52) U.S. Cl. ............... 248/229.16; 248/231.51; 248/121

(58) Field of Classification Search ............. 248/229.16, 248/229.14, 229.21, 230.5, 231.61, 535, 248/224.8, 225.11, 225.21, 218.4, 219.1, 248/219.4, 200.1, 231.51, 121
See application file for complete search history.

(56) References Cited

U.S. PATENT DOCUMENTS

| 0,475,383 | A | | 5/1892 | Cleaveland |
| 1,106,152 | A | | 8/1914 | McIntosh et al. |
| 2,248,170 | A | * | 7/1941 | Hansen .......................... 224/570 |
| 2,365,985 | A | | 12/1944 | West |
| 2,757,882 | A | | 8/1956 | Maitland |
| 2,876,027 | A | | 3/1959 | Sulmonetti |
| 3,327,310 | A | * | 6/1967 | Bethune et al. ............... 343/702 |

(Continued)

FOREIGN PATENT DOCUMENTS

| DE | 19946042 | 3/2001 |
| DE | 102004045993 | 4/2006 |
| WO | WO 99/35465 | 7/1999 |
| WO | WO 03/053636 | 7/2003 |
| WO | 2004047592 | 6/2004 |

OTHER PUBLICATIONS

"Partition Mount" Specification, Drawings, and Prosecution History, of U.S. Appl. No. 08/740,372, filed Oct. 29, 1996, by Jeffrey Whittemore, which is stored in the United States Patent and Trademark Office (USPTO) File Repository.

(Continued)

*Primary Examiner* — Anita M King
(74) *Attorney, Agent, or Firm* — Onello & Mello LLP

(57) ABSTRACT

An accessory mounting system and mounting method thereof provides an effective solution for sectioning a portion of a room and for organizing tools, objects and cables involved in the activity that gives rise to the need for sectioning or organizing the room. In particular, the present invention provides an accessory mounting system and method whereby accessories can be mounted to poles that are designed for use in temporary partitioning systems, or to other poles such as painter's poles. Such accessories can include, for example, a caution tape dispenser that mounts to a side surface of a pole following installation of the pole, and various pole clips that locate the caution tape at other poles in a clean, visually attractive, and effective manner. Other accessories include tool mounts, cable mounts, shelves, trays, drawers, hooks, camera or laser mounts, and the like, all attachable to a side surface of a pole following installation of the pole.

20 Claims, 18 Drawing Sheets

U.S. PATENT DOCUMENTS

| | | | |
|---|---|---|---|
| 3,425,127 | A | 2/1969 | Long et al. |
| 3,856,232 | A | 12/1974 | Rinaldi |
| 3,881,677 | A | 5/1975 | Ihlenfeld |
| 3,917,231 | A | 11/1975 | Fink |
| 4,115,966 | A | 9/1978 | DeLee |
| 4,307,864 | A | 12/1981 | Benoit |
| 4,844,420 | A | 7/1989 | Oster |
| 5,056,753 | A | 10/1991 | Lunau et al. |
| 5,184,911 | A * | 2/1993 | Wu .............................. 403/385 |
| 5,305,978 | A | 4/1994 | Current |
| 5,386,961 | A | 2/1995 | Lu |
| 5,497,214 | A | 3/1996 | Labree |
| 5,542,776 | A | 8/1996 | Reynolds |
| 5,752,670 | A | 5/1998 | Lasecki et al. |
| 5,829,723 | A | 11/1998 | Brunner et al. |
| 5,924,469 | A | 7/1999 | Whittemore |
| 6,085,955 | A | 7/2000 | Hicks et al. |
| 6,205,679 | B1 | 3/2001 | Rodway et al. |
| 6,209,615 | B1 | 4/2001 | Whittemore |
| 6,256,895 | B1 | 7/2001 | Akers |
| 6,315,256 | B1 | 11/2001 | Tolar |
| 6,321,823 | B1 | 11/2001 | Whittemore |
| 6,375,164 | B1 | 4/2002 | Siegler et al. |
| 6,508,295 | B2 | 1/2003 | Whittemore |
| 6,557,808 | B1 | 5/2003 | Ling |
| 6,595,496 | B1 | 7/2003 | Langlie et al. |
| 6,598,304 | B2 | 7/2003 | Akers |
| 6,626,391 | B2 | 9/2003 | Kretsch et al. |
| 6,942,004 | B2 | 9/2005 | Whittemore |
| 6,953,076 | B2 | 10/2005 | Whittemore |
| 6,988,690 | B2 | 1/2006 | Hsu |
| 7,073,758 | B2 | 7/2006 | Whittemore et al. |
| 7,108,040 | B2 | 9/2006 | Whittemore |
| 7,111,812 | B2 | 9/2006 | Shannon et al. |
| 7,261,140 | B2 | 8/2007 | Whittemore |
| 7,503,373 | B2 | 3/2009 | Whittemore |
| 7,658,219 | B2 | 2/2010 | Whittemore |
| 7,717,382 | B2 | 5/2010 | Whittemore et al. |
| 2001/0037579 | A1 | 11/2001 | Akers |
| 2002/0011316 | A1 | 1/2002 | Whittemore |
| 2002/0174552 | A1 | 11/2002 | Akers |
| 2003/0070773 | A1 | 4/2003 | Whittemore |
| 2004/0031892 | A1 | 2/2004 | Whittemore et al. |
| 2004/0200585 | A1 | 10/2004 | Whittemore |
| 2005/0247414 | A1 | 11/2005 | Whittemore |
| 2005/0284591 | A1 | 12/2005 | Whittemore |
| 2006/0197000 | A1 | 9/2006 | Meltzer |
| 2006/0272785 | A1 | 12/2006 | Whittemore |
| 2007/0257170 | A1 | 11/2007 | Whittemore et al. |
| 2008/0006374 | A1 | 1/2008 | Whittemore |
| 2009/0071614 | A1 | 3/2009 | Whittemore |
| 2010/0108849 | A1 | 5/2010 | Whittemore |

OTHER PUBLICATIONS

"Partition Mount" Specification, Drawings, and Prosecution History, of U.S. Appl. No. 09/302,122, filed Apr. 29, 1999, by Jeffrey Whittemore, which is stored in the United States Patent and Trademark Office (USPTO) File Repository.

"Partition Mount" Specification, Drawings, and Prosecution History, of U.S. Appl. No. 09/613,645, filed Jul. 11, 2000, by Jeffrey Whittemore, which is stored in the United States Patent and Trademark Office (USPTO) File Repository.

"Partition Mount" Specification, Drawings, and Prosecution History, of U.S. Appl. No. 09/884,337, filed Jun. 19, 2001, by Jeffrey Whittemore, which is stored in the United States Patent and Trademark Office (USPTO) File Repository.

"Partition Mount" Specification, Drawings, and Prosecution History, of U.S. Appl. No. 10/301,233, filed Nov. 21, 2002, by Jeffrey Whittemore, which is stored in the United States Patent and Trademark Office (USPTO).

"Partition Mount" Specification, Drawings, and Prosecution History, of U.S. Appl. No. 10/865,174, filed Jun. 10, 2004, by Jeffrey Whittemore, which is stored in the United States Patent and Trademark Office (USPTO).

"Partition Mount" Specification, Drawings, and Prosecution History, of U.S. Appl. No. 11/223,081, filed Sep. 9, 2005, by Jeffrey Whittemore, which is stored in the United States Patent and Trademark Office (USPTO).

"Partition Mount" Specification, Drawings, and Prosecution History, of U.S. Appl. No. 11/458,804, filed Jul. 20, 2006, by Jeffrey Whittemore, which is stored in the United States Patent and Trademark Office (USPTO).

"Partition Mount" Specification, Drawings, and Prosecution History, of U.S. Appl. No. 11/778,907, filed Jul. 17, 2007, by Jeffrey Whittemore, which is stored in the United States Patent and Trademark Office (USPTO).

"Partition Mount" Specification, Drawings, and Prosecution History, of U.S. Appl. No. 12/275,496, filed Nov. 21, 2008, by Jeffrey Whittemore, which is stored in the United States Patent and Trademark Office (USPTO).

"Pole Clamp for Partition Mount" Specification, Drawings, and Prosecution History, of U.S. Appl. No. 10/600,939, filed Jun. 20, 2003, by Jeffrey Whittemore, which is stored in the United States Patent and Trademark Office (USPTO).

"Partition Mount with Integrated Plunger Assembly" Specification, Drawings, and Prosecution History, of U.S. Appl. No. 11/125,583, filed May 10, 2005, by Jeffrey Whittemore, which is stored in the United States Patent and Trademark Office (USPTO).

"Partition Mount with Integrated Plunger Assembly" Specification, Drawings, and Prosecution History, of U.S. Appl. No. 12/683,650, filed Jan. 7, 2010, by Jeffrey Whittemore, which is stored in the United States Patent and Trademark Office (USPTO).

"Accessory Mounting Systems and Mounting Methods Thereof" Specification, Drawings, and Prosecution History, of U.S. Appl. No. 11/415,624, filed May 2, 2006, by Jeffrey Whittemore, which is stored in the United States Patent and Trademark Office (USPTO).

* cited by examiner

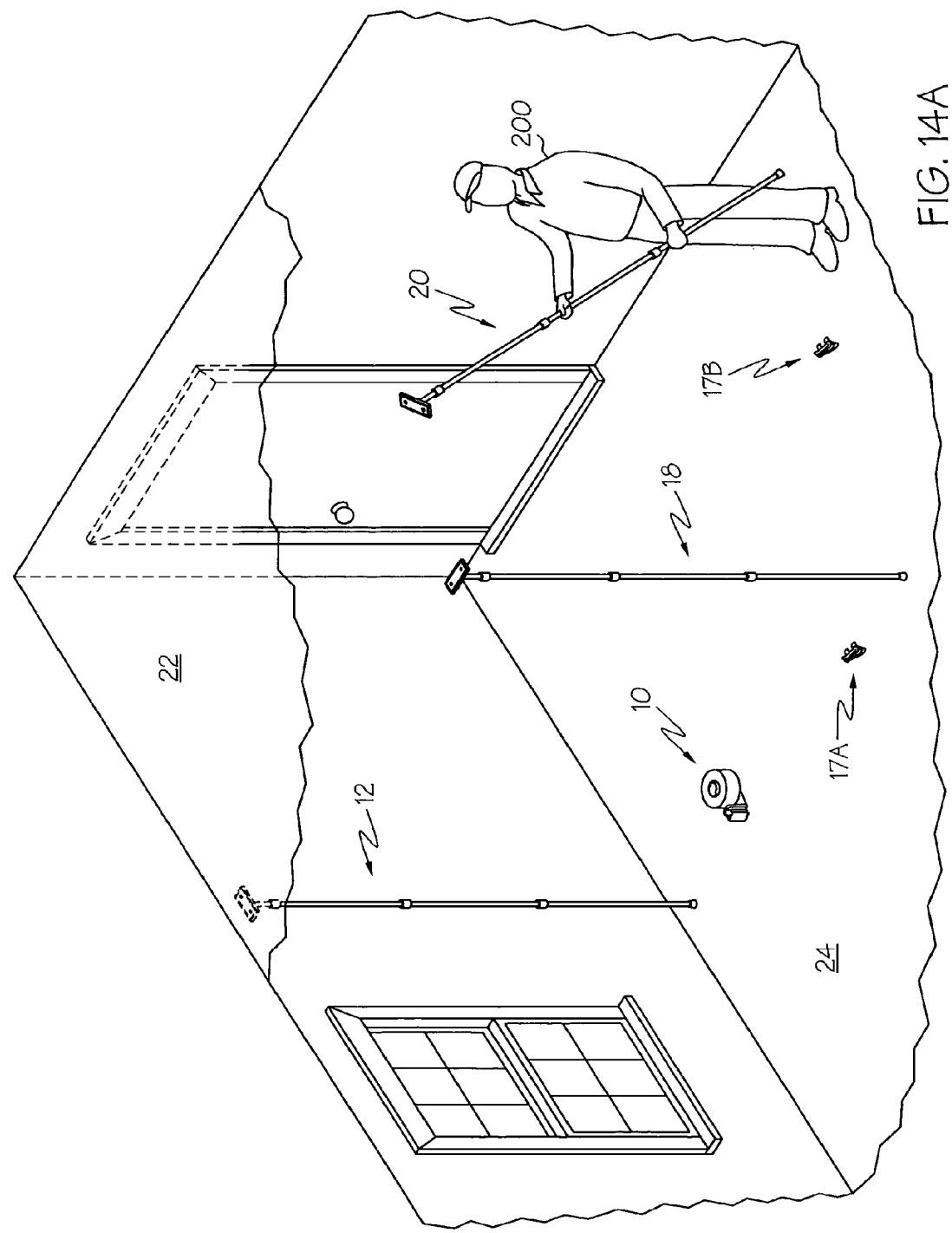

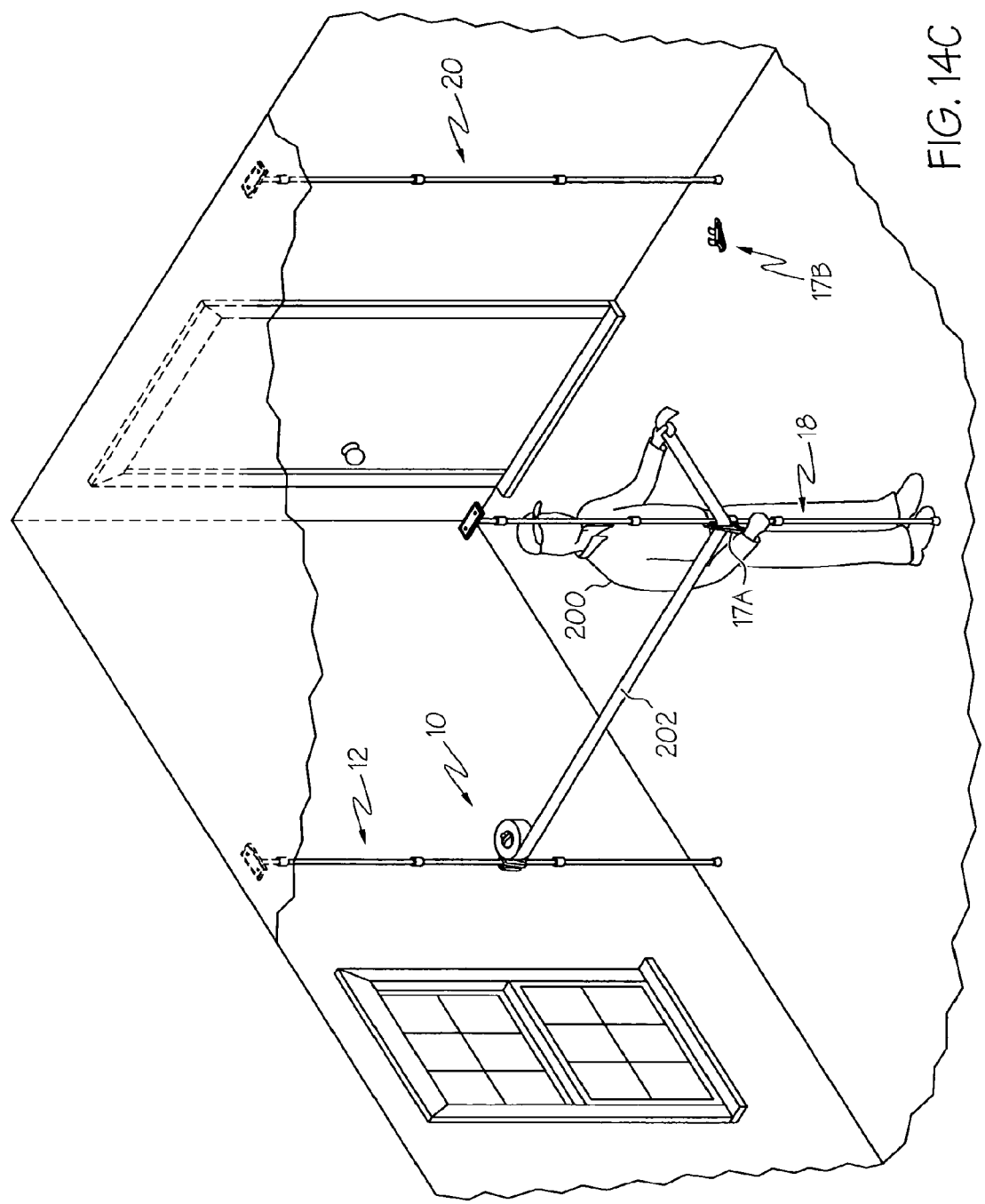

ACCESSORY MOUNTING SYSTEMS

RELATED APPLICATIONS

This application is a continuation application of U.S. application Ser. No. 11/415,624, filed May 2, 2006, the contents of which being incorporated herein by reference, in their entirety.

BACKGROUND OF THE INVENTION

Partition systems are employed to isolate portions of a building or room, by serving as a barrier to dust, noise, light, odors, and the like. In construction zones, partitions are useful for protecting a clean area from a work area, for example, protecting an area where furniture and rugs are temporarily stored from an area where wood floors are being refinished. U.S. Pat. No. 5,924,469, U.S. Ser. No. 10/600,939, filed Jun. 20, 2003, published as United States Patent Application Publication Number 2004/0031892, U.S. Ser. No. 10/600,300, filed Jun. 20, 2003, published as United States Patent Application Publication Number 2004/0065799, and U.S. Ser. No. 11/125,583, filed May 10, 2005, published as United States Patent Application Publication Number 2005/0247414, the contents of each being incorporated herein by reference, disclose various partition mounting systems. These systems offer the advantages of modularity, visual attractiveness, and effectiveness in performing the partitioning function, and are compatible with a variety of commercially-available curtain or drape materials, for example plastic and cloth sheeting, and the like. The disclosed systems are "clean" systems designed to be installed and removed without damaging or otherwise marking the ceiling, floor or walls in the construction zone. Assembly is easy and fast and can be accomplished by a single individual.

Spooled caution tape is often used to designate a portion of a room, such as a construction zone, as being dangerous or inaccessible. The caution tape is usually simply tied in a knot to objects that are located in the room in order to section off the area. This solution is unsightly for certain installations, such as hotel and bank lobbies, where a visually attractive solution is desired. Installation and removal are difficult since knotting the tape to existing objects can be challenging and since removal can require a need for cutting with a knife without scratching the surface of the underlying object. In addition, the caution tape that is attached is difficult to pull taut upon installation.

Construction zones also characteristically include other dangers such as the presence of electrical wires extending across the floor and various tools and other objects scattered about. This presents a hazard both for construction workers, and owners and guests of the building. To date, organization systems for construction zones are either non-existent or ineffective.

SUMMARY OF THE INVENTION

The present invention is directed to an accessory mounting system and mounting method thereof that provides an effective solution for sectioning a portion of a room and for organizing tools, objects and cables involved in the activity that gives rise to the need for sectioning the room.

In particular, the present invention provides an accessory mounting system and method whereby accessories can be mounted to poles that are designed for use in temporary partitioning systems, or to other poles such as painter's poles. Such accessories can include, for example, a caution tape dispenser that mounts to a side surface of a pole following installation of the pole, and various pole clips that locate the caution tape at other poles in a clean, visually attractive, and effective manner. Other accessories include tool mounts, cable mounts, shelves, drawers, hooks, camera or laser mounts, and the like, all attachable to a side surface of a pole following its installation. In one embodiment, the pole is adjustable in length. In another embodiment, the pole includes a portion that is compressible, for example by a spring, so that a top and a bottom portion of the pole can be compressed and held in place between two surfaces of a room, such as a floor and a ceiling.

In one aspect, the present invention is directed to a pole accessory mounting system, comprising: a hand-releasable clamp having a pole interface that is adjustable in width, the clamp constructed and arranged to mount to a body portion of a pole between a first end and a second end of the pole; a pole accessory being constructed and arranged to be coupled to the clamp; and an adapter that couples the pole accessory to the hand-releasable clamp.

In one embodiment, the system comprises multiple hand-releasable clamps, multiple pole accessories, and multiple adapters, the multiple hand-releasable clamps being similar in configuration, each pole accessory being constructed and arranged to be coupled to a corresponding one of the multiple hand-releasable clamps at a corresponding adapter. In another embodiment, at least two of the multiple pole accessories have a different configuration. In another embodiment, the pole accessories comprise at least two of a caution tape dispenser accessory, a shelf accessory, a wire clip accessory, a hook accessory, a lighting accessory, and a laser/camera mounting accessory.

In another embodiment, the pole accessory comprises at least one of a caution tape dispenser accessory, a shelf accessory, a wire clip accessory, a hook accessory, a lighting accessory, a laser/camera mounting accessory, and a tray accessory.

In another embodiment, the pole interface of the hand-releasable clamp includes multiple arcuate sections that surround portions of a pole.

In another embodiment, the pole interface includes a non-skid material at a point of contact between the pole interface and the pole to which the clamp is mounted.

In another embodiment, the system further comprises a pole having a length that is adjustable. In another embodiment, the pole comprises multiple telescoping segments of different outer widths. In another embodiment, the pole comprises a circular cross section. In another embodiment, the pole includes a compression mechanism between a first end and a second end of the pole that biases the first end in a direction away from the second end. In another embodiment, the pole includes a curtain mounting head at one of the first end and the second end.

In another embodiment, the clamp is constructed and arranged to mount to a body portion of a pole between the first end and the second end following installation of the pole between first and second surfaces of a room.

In another embodiment, the clamp comprises a first body portion and a second body portion, at least one of the first and the second body portions of the clamp pivoting relative to the adapter.

In another embodiment, one of the first and second body portions of the clamp includes a latching arm that extends from the body portion of the clamp, the latching arm including an engagement feature, and wherein the other of the first and second body portions of the clamp includes multiple engagement tabs, the width of the pole interface being adjustable according to the one of the multiple engagement tabs that is engaged with the engagement feature.

In another embodiment, the latching arm pivots relative to the body portion of the clamp from which it extends.

In another embodiment, at least one of the first and second body portions of the clamp includes at least one pivot hook that retains corresponding rod features on the adapter so that the at least one clamp body portion pivots relative to the adapter.

In another embodiment, the adapter is integral with the accessory.

In another embodiment, the adapter is removably attachable to the accessory.

In another embodiment, the accessory includes an adapter slot that receives a body portion of the adapter. In another embodiment, one of the adapter slot of the accessory and the adapter includes retention hooks, and the other one of the adapter slot of the accessory and the adapter includes retention slots, and wherein the retention hooks mate with the retention slots to retain the adapter in the adapter slot.

In another embodiment, the accessory comprises a dispenser that dispenses a ribbon of material, comprising: a dispenser body portion; and a spool that rotates relative to the body portion about a spool axis, the spool constructed and arranged to dispense a ribbon of material, wherein the spool extends from the pole so that the spool axis and an axis of elongation of the pole are spaced apart.

In another embodiment, the spool has one or more outer surface portions that correspond to an inner diameter of a standard roll of caution tape, for example of 3 inch inner diameter.

In another embodiment, the dispenser further includes a locking mechanism that prevents rotation of the spool relative to the dispenser body portion.

In another embodiment, the dispenser further includes a handle that extends from the spool for rapid manual rotation of the spool relative to the dispenser body portion.

In another embodiment, the dispenser further includes an adjustable tension mechanism that adjusts tension in the rotation of the spool relative to the dispenser body portion.

In another aspect, the present invention is directed to a dispenser mountable to a pole that dispenses a ribbon of material, comprising: a dispenser body portion; a spool that rotates relative to the dispenser body portion about a spool axis, the spool constructed and arranged to dispense a ribbon of material; and a pole mount that mounts the dispenser body portion and the spool to a pole so that the spool extends from the pole so that the spool axis and an axis of elongation of the pole are spaced apart.

In one embodiment, the spool has one or more outer surface portions that correspond to an inner diameter of a standard roll of caution tape, for example of 3 inch inner diameter.

In another embodiment, the dispenser further includes a locking mechanism that prevents rotation of the spool relative to the dispenser body portion.

In another embodiment, the dispenser further includes a handle that extends from the spool for rapid manual rotation of the spool relative to the dispenser body portion.

In another embodiment, the dispenser further includes an adjustable tension mechanism that adjusts tension in the rotation of the spool relative to the dispenser body portion.

In another embodiment, the pole mount comprises: a hand-releasable clamp having a pole interface that is adjustable in width, the clamp constructed and arranged to mount to a body portion of a pole between a first end and a second end of the pole; and an adapter that couples the dispenser body portion to the hand-releasable clamp.

In another embodiment, the pole interface of the hand-releasable clamp includes multiple arcuate sections that surround portions of a pole.

In another embodiment, the pole interface includes a non-skid material at a point of contact between the pole interface and the pole to which the clamp is mounted.

In another embodiment, the dispenser further comprises a pole having a length that is adjustable. In another embodiment, the pole comprises multiple telescoping segments of different outer widths. In another embodiment, the pole comprises a circular cross section. In another embodiment, the pole includes a compression mechanism between a first end and a second end of the pole that biases the first end in a direction away from the second end. In another embodiment, the pole includes a curtain mounting head at one of the first end and the second end.

In another embodiment, the clamp is constructed and arranged to mount to a body portion of a pole between the first end and the second end following installation of the pole between first and second surfaces of a room. In another embodiment, the clamp comprises a first body portion and a second body portion, at least one of the first and the second body portions of the clamp pivoting relative to the adapter. In another embodiment, one of the first and second body portions of the clamp includes a latching arm that extends from the body portion of the clamp, the latching arm including an engagement feature, and wherein the other of the first and second body portions of the clamp includes multiple engagement tabs, the width of the pole interface being adjustable according to the one of the multiple engagement tabs that is engaged with the engagement feature. In another embodiment, the latching arm pivots relative to the body portion of the clamp from which it extends. In another embodiment, at least one of the first and second body portions of the clamp includes at least one pivot hook that retains corresponding rod features on the adapter so that the at least one clamp body portion pivots relative to the adapter.

In another embodiment, the adapter is integral with the dispenser body portion. In another embodiment, the adapter is removably attachable to the dispenser body portion. In another embodiment, the dispenser body portion includes an adapter slot that receives a body portion of the adapter. In another embodiment, one of the adapter slot of the dispenser body portion and the adapter includes retention hooks, and the other one of the adapter slot of the dispenser body portion and the adapter includes retention slots, and wherein the retention hooks mate with the retention slots to retain the adapter in the adapter slot.

In another aspect, the present invention is directed to a ribbon guide comprising: an elongated body portion; multiple offset pole interface fingers extending from the body portion having a curved cross-section constructed and arranged to be press-fit onto an outer body surface of a pole between a first end and a second end of the pole; and an elongated slot having an opening in which an edge portion of a ribbon of material can be inserted and removed.

In one embodiment, the elongated slot is of a length that is at least a width of a caution tape.

In another embodiment, the elongated slot includes a trap that permits insertion of an edge portion of a ribbon of material and resists removal of the edge portion of the ribbon of material.

In another embodiment, the ribbon guide further comprises a thumb release feature at which manual leverage can be applied to remove the ribbon guide from a pole to which the ribbon guide is mounted.

In another aspect, the present invention is directed to a method of mounting a pole accessory to a pole comprising: coupling a pole accessory to a hand-releasable clamp at an adapter; and applying a hand-releasable clamp having a pole interface that is adjustable in width to a body portion of a pole between a first end and a second end of the pole to secure the clamp and the pole accessory to the pole.

In one embodiment, the pole accessory comprises at least one of a caution tape dispenser accessory, a shelf accessory, a wire clip accessory, a hook accessory, a lighting accessory, a laser/camera mounting accessory, and a tray accessory.

In another embodiment, the method further comprises installing the pole having a length that is adjustable between first and second surfaces of a room.

In another embodiment, applying the hand-releasable clamp comprises applying the hand-releasable clamp after installing the pole.

In another embodiment, the pole comprises multiple telescoping segments of different outer widths.

In another embodiment, the pole comprises a circular cross section.

In another embodiment, the pole includes a compression mechanism between a first end and a second end of the pole that biases the first end in a direction away from the second end, and further comprising compressing the compression mechanism during installation of the pole.

In another embodiment, the adapter is integral with the accessory.

In another embodiment, the adapter is removably attachable to the accessory, and further comprising mounting the adapter to the accessory.

In another embodiment, the accessory comprises a dispenser that dispenses a ribbon of material, comprising: a dispenser body portion; and a spool that rotates relative to the body portion about a spool axis, the spool constructed and arranged to dispense a ribbon of material, wherein the spool extends from the pole so that the spool axis and an axis of elongation of the pole are spaced apart, and wherein the method further comprises mounting a roll of ribbon material to the spool and dispensing the ribbon of material.

In another aspect, the present invention is directed to a method of sectioning an area of a room, comprising: installing multiple poles between first and second surfaces of a room in the area to be sectioned; mounting a ribbon dispenser including a ribbon of material to a body portion of a first pole of the multiple poles between first and second ends of the first pole; pulling the ribbon of material toward a second pole of the multiple poles; mounting a ribbon guide including a ribbon slot to the second pole; and placing the ribbon through the ribbon slot of the ribbon guide.

In one embodiment, the method further comprises: pulling the ribbon of material to a third pole of the multiple poles; and clamping the ribbon of material to a body portion of the third pole.

In another embodiment, the ribbon dispenser comprises: a dispenser body portion; and a spool that rotates relative to the body portion about a spool axis, the spool constructed and arranged to dispense the ribbon of material, wherein the spool extends from the pole so that the spool axis and an axis of elongation of the pole are spaced apart, and further comprising mounting a roll of ribbon material to the spool and dispensing the ribbon of material.

In another embodiment, the ribbon of material comprises a roll of caution tape.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 14A-14E are sequential illustrations of the installation of an accessory system, including installation of a caution tape dispenser accessory, lighting accessory, shelf accessory and hook accessory, in accordance with the present invention.

DETAILED DESCRIPTION OF EMBODIMENTS OF THE PRESENT INVENTION

The present invention is directed to an accessory mounting system and mounting method thereof that provides an effective solution for sectioning a portion of a room or for organizing tools and objects, such as lighting and lasers, and cables involved in the activity that gives rise to the need for sectioning the room. Various embodiments of the present invention include accessories that are configured to mount to a side portion of an adjustable length pole, that is installed between two surfaces of a room, such as a floor and ceiling of a room. An advantage of the present invention lies in that the accessories each include a clamp that attaches to a side portion of a pole and therefore can be mounted, and adjusted in vertical position and angular orientation, following installation of the pole. In certain embodiments of the present invention, the clamp is hand-adjusted, hand-secured and hand-released, for ease of use. Accessories can be provided for a number of different functions, including a caution tape dispenser and related tape guides, tool mounts, cable mounts, shelves, drawers, lighting mounts, laser mounts, camera mounts, hooks, and other related supports and organization aids that lead to a more visually attractive, and safer, work area.

In certain embodiments of the accessory mounting systems and mounting methods of the present invention, the different types of accessories are attachable to the side portion of a pole at a clamp and accessory connector that have the same modular form, and are therefore compatible with each different type of accessory. This is accomplished by providing each accessory to include a similar clamp attachment at the interface between the accessory body and the clamp. In this manner, each of the different types of accessories is modular with the clamp in the sense that each accessory can share the same type of pole clamp. This feature reduces tooling and manufacturing costs.

Figure 1:
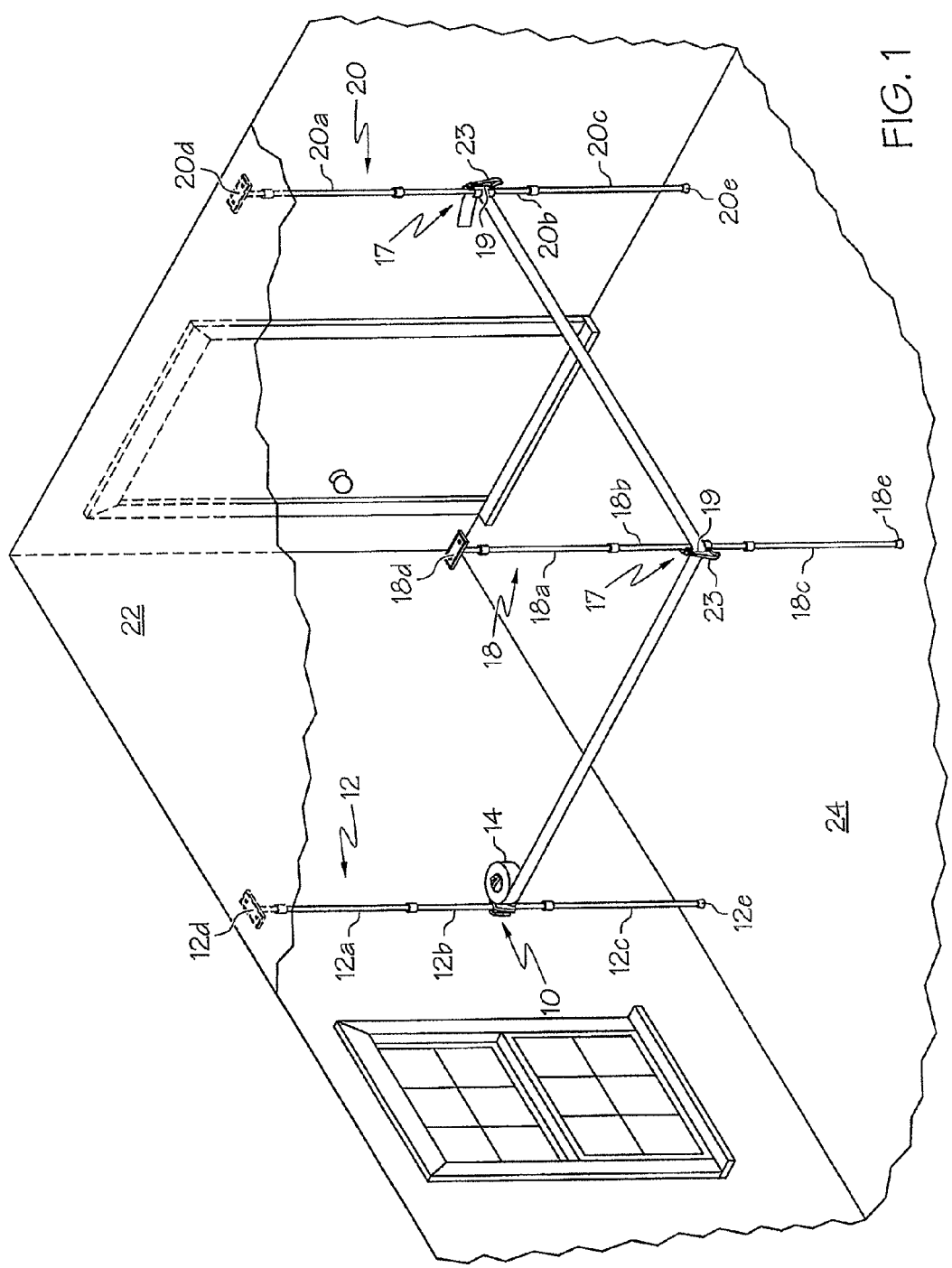
FIG. 1 is an illustration of an accessory mounting system, including a caution tape dispenser for partitioning or designating a section of a room, in accordance with the present invention.

FIG. 1 is an illustration of an embodiment of an accessory mounting system including a caution tape dispenser used for partitioning a section of a room, in accordance with the present invention. In this embodiment, first, second and third telescoping poles 12, 18, 20 are adjusted in height and installed between a floor 24 and a ceiling 22 of a room. Each pole 12, 18, 20, includes a foot 12e, 18e, 20e that interfaces with the floor 24 and a head 12d, 18d, 20d, that interfaces with the ceiling 22. The foot 12e, 18e, 20e and the head 12d, 18d, 20d preferably include lower and upper engaging surfaces that are formed of a non-skid material to prevent lateral slip of the poles 12, 18, 20 once installed. The poles 12, 18, 20 as shown are telescoping poles, so as to be adjustable in length, and include twist-locking mechanisms, or tab mechanisms, to fix their length, once adjusted. Each portion of a telescoping pole 12a, 12b, 12c has a different width. The poles 12, 18, 20 can optionally include a compression mechanism, for example a spring, between the foot 12e, 18e, 20e and the head 12d, 18d, 20d in order to provide a tensioned interface between the poles 12, 18, 20 and the room surfaces 22, 24. The head 12d, 18d, 20d or foot 12e, 18e, 20e, may optionally include a pivot joint so that the poles 12, 18, 20 can be securely mounted between room surfaces 22, 24 that are not parallel to each other, or so that the pole can be mounted at an angle relative to the room surfaces 22, 24.

In the example embodiment of FIG. 1, a caution tape dispenser accessory 10 is mounted to a side portion of the installed first pole 12. The caution tape dispenser 10 is clamped to a second portion 12b of the first pole 12, and secured in place so as to extend laterally from the pole 12. A roll of caution tape 14 is provided on the dispenser 10. A detailed description of an embodiment of the caution tape dispenser and the clamp for securing the caution tape dispenser to the pole is provided in further detail below.

The second and third poles 18, 20 are each provided with a tape guide clip 17. The tape guide clips 17 include opposed fingers that flexibly snap about a side portion of a lower portion of the pole. The tape guide clips 17 include a tape slot 19 through which the caution tape can be positioned and a handle 23. The caution tape 14 in this example is pulled from the dispenser 10 and passes through the slot 19 of the tape guide clip 17 mounted to the second pole 18. From there, the caution tape 14 is extended to the third pole 20, where an end of the tape is secured to the body of the third pole 20 by the tape guide clip 17. At the third pole 20, the end of the caution tape is clamped directly to the body of the third pole by the opposed clamping fingers. In this manner, the tape guide clips 17 serve the dual purpose of positioning the caution tape relative to the pole, as shown in FIG. 1 for the second pole 18, and for clamping the end of the caution tape to the pole, as shown in FIG. 1 for the third pole 20.

The caution tape dispenser accessory 10 can be provided with an optional tensioning mechanism that provides tension in the caution tape to prevent sagging, and further can be provided with a locking mechanism to fix the length of the tape, once dispensed and adjusted. An optional handle can be provided on the dispenser 10 for reeling in the tape when the project is complete. In addition, the caution tape dispenser accessory can be provided with a self-retracting spool for automatically retracting the dispensed tape. The caution tape is readily attachable to the poles 12, 18, 20 and is held taut and at a desired height. In this manner, a room can be sectioned in a relatively simple and tidy fashion.

Figures 2A, 2B:
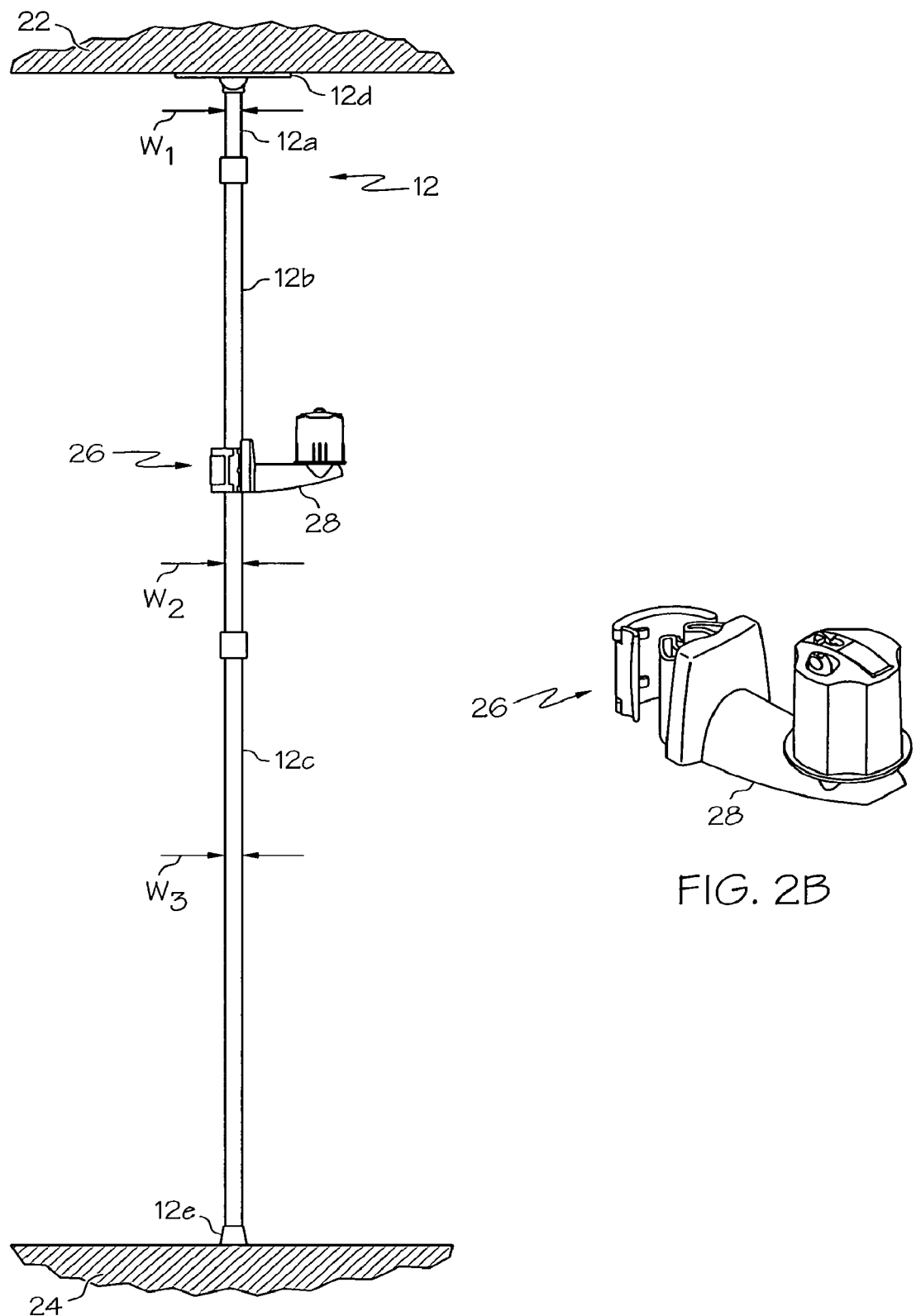
FIG. 2A is a side view of an installed pole having mounted thereto a caution tape dispenser as shown in FIG. 1.
FIG. 2B is a perspective view of the caution tape dispenser of FIG. 2A being installed on the pole, in accordance with the present invention.

FIG. 2A is a side view of a caution tape dispenser 10 mounted to an installed pole 12 and FIG. 2B is a side view of the caution tape dispenser 10 of FIG. 2A being mounted to the installed pole 12, in accordance with the present invention. The pole 12 includes first, second and third telescoping sections 12a, 12b, 12c of different respective widths w1, w2, w3. A spool of caution tape is installed on a caution tape dispenser accessory 10 mounted to the second section 12b of the first pole 12. The caution tape dispenser accessory includes a clamp 26 and an accessory body 28. The clamp 26 is adjustable so that the caution tape dispenser 10, or other accessory attached to the clamp 26, can be readily mounted and secured to any of the pole sections 12a, 12b, 12c of different widths.

Figure 3:
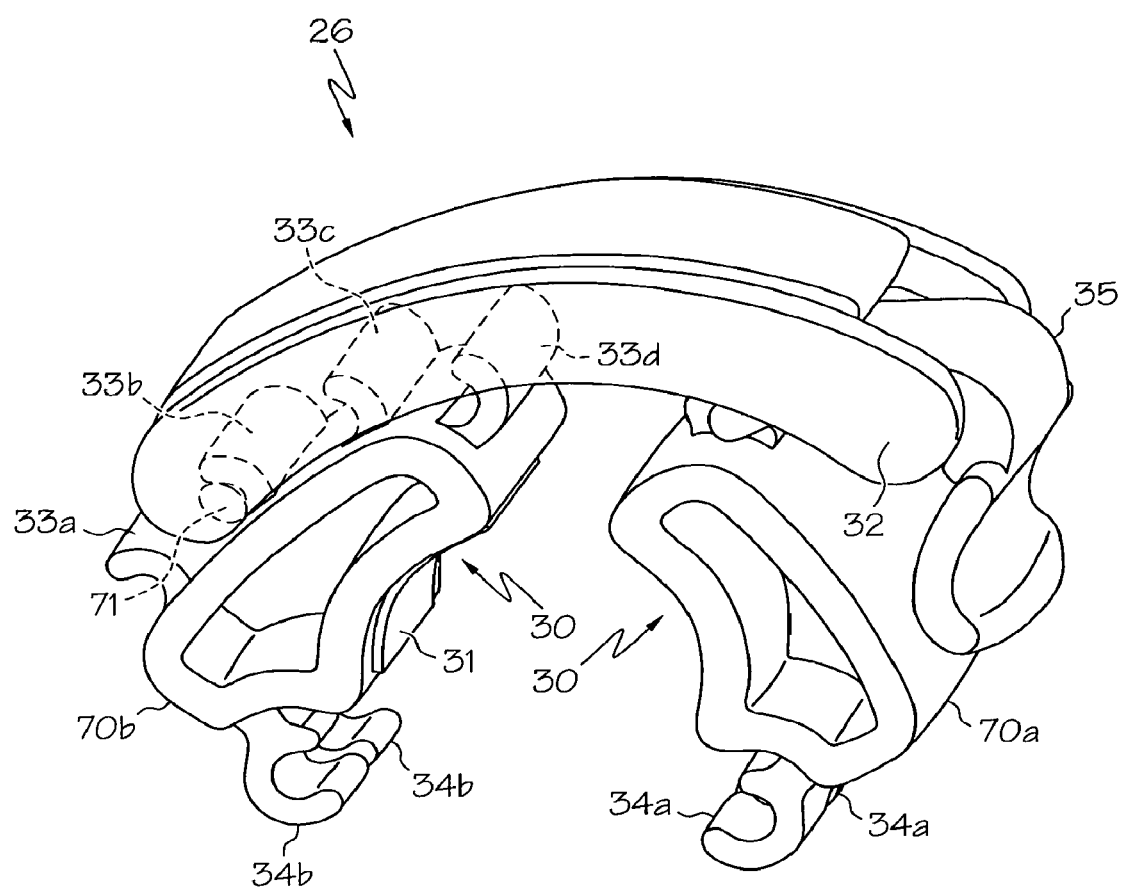
FIG. 3 is a perspective view of a clamp for mounting the caution tape dispenser, or other accessory, to a pole, in accordance with the present invention.

FIG. 3 is a perspective view of a clamp 26 for mounting the caution tape dispenser, or other accessory, to a pole, in accordance with the present invention. The clamp 26 includes a first clamp body 70a and a second clamp body 70b. Each of the first and second clamp bodies 70a, 70b includes a pole interface 30 on an inner surface thereof. The pole interface 30 includes, in one embodiment, a pad of compressible high-friction foam or other non-skid material 31 for preventing the clamp 26 and accessory from slipping relative to the pole. The first clamp body 70a includes a latch 32 and latch handle 35 on an outer surface thereof, and the second clamp body 70b includes multiple tabs 33a, 33b, 33c, 33d on an outer surface thereof. The latch 32 engages any one of the multiple tabs 33a, 33b, 33c, 33d at engagement feature 71 for locking the clamp 26 into position on the pole. The latch handle 35 pivots relative to the latch 32, and rests against a feature of the first clamp body 70a, so that when the engagement feature 71 of the latch is placed in engagement with one of the multiple tabs 33a, 33b, 33c, 33d, the latch 32 is locked in place by rotating the latch handle 35, which induces leverage against the first clamp body 70a to pull the latch 32 into a locked position. Similarly, by rotating the latch handle 35 in an opposite direction, the latch 32 can be removed from the locked position. By including multiple tabs 33a, 33b, 33c, 33d on the second clamp body 70b of varying distance relative to the first clamp body 70a, the clamp 26 is made to be adjustable for attaching the clamp to poles, or pole sections, having different widths w1, w2, w3, as shown in FIG. 2A above. Each of the first and second clamp bodies 70a, 70b further includes pivot hooks 34a, 34b for rotatably attaching the clamp to a connector 36, or adapter, as described below. The latch 32 is hand-releasable, such that the clamp 26 can be attached to the pole or removed from a side portion of the pole following positioning and mounting of the pole 12 between the first and second room surfaces. Alternatively, the clamp can optionally be attached to or removed from the pole prior to mounting the pole or following removal of the pole. By providing the ability to attach the clamp and corresponding accessory to a side portion of the pole, it is not necessary to install the clamp and accessory at or over an end portion of the pole, for example at the head or the foot 12d, 12e, as in some conventional apparatus, which leads to a more complicated installation. In addition, the angular orientation of clamp 26 and corresponding accessory and the vertical position of the clamp and corresponding accessory is entirely adjustable relative to the pole, for optimizing placement of the accessory. Compressibility in the pad of material 31 allows for play in the width of the resulting pole interface, which can compensate for small differences in pole outer diameter relative to the indexed clamp settings.

Figure 4:
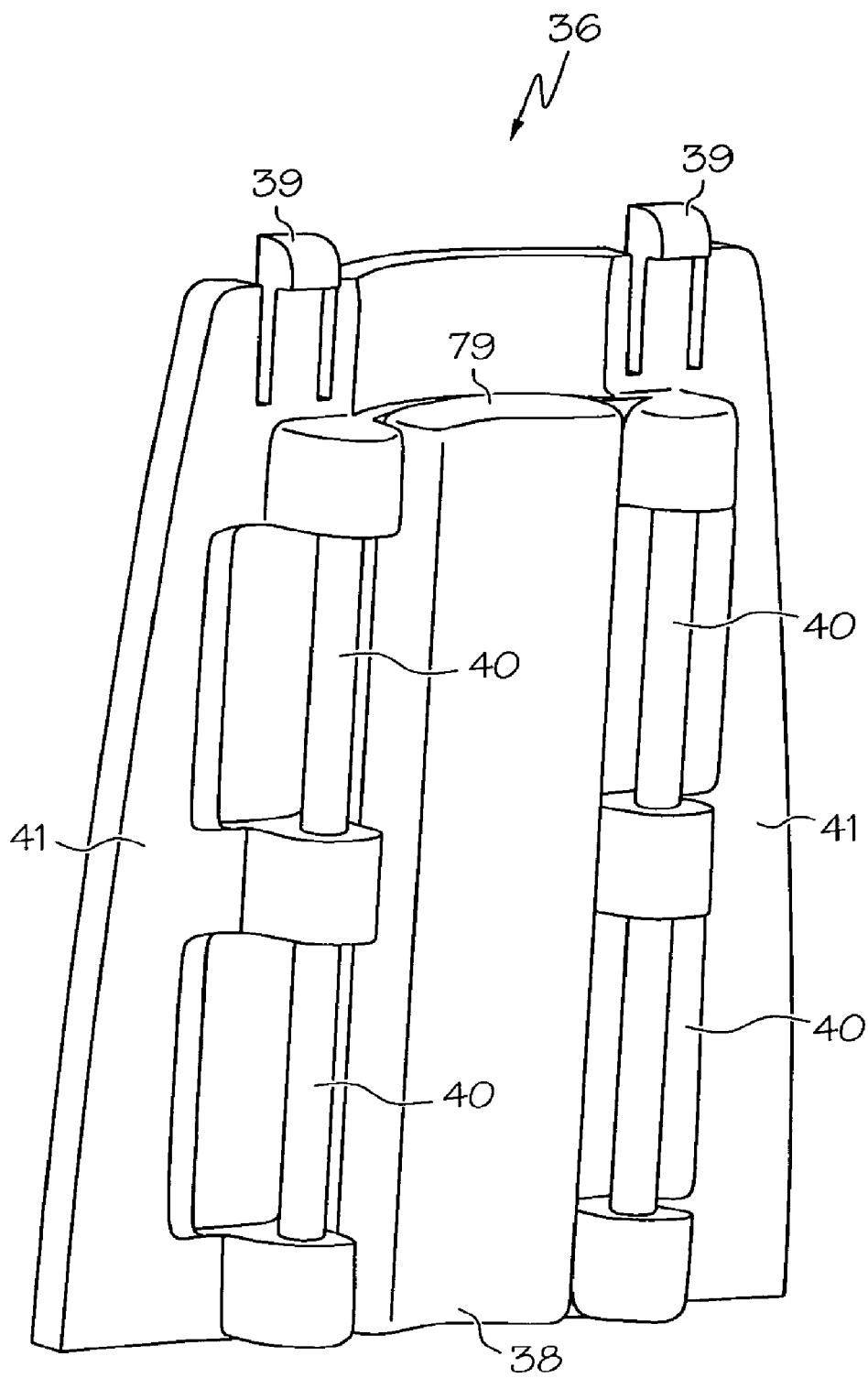
FIG. 4 is a perspective view of a modular accessory connector for attaching accessories to the clamp of FIG. 3 in accordance with the present invention.

FIG. 4 is a perspective view of an adapter in the form of a modular accessory connector 36 for attaching accessories to the clamp of FIG. 3 in accordance with the present invention. A modular accessory connector 36, or adapter, includes a body 41 that includes a pole interface 38 and rod features 40. The pivot hooks 34a, 34b of the first and second body portions 70a, 70b of the clamp 26 snap-fit onto the rods 40 of the modular accessory connector 36. In this manner, the pivot hooks 34a, 34b of the clamp body portions 70a, 70b pivot relative to the modular accessory connector 36 in a hinged relationship, so that in combination, the modular accessory connector 36 and clamp 26 articulate about the pole to ease installation and removal of the accessory to and from the pole. Like the pole interface 30 of the clamp 26, the pole interface 38 of the modular accessory connector includes a pad 79 of compressible high-friction foam or non-skid material which prevents the installed clamp from sliding relative to the pole. The body 41 of the modular accessory connector 36 further includes retention hooks 39, for example integral retention hooks 39, that extend from the top of the modular accessory connector 36. The retention hooks 39 are preferably elastically deformable so that they can latch with corresponding openings or slots 49 in a mating accessory mounting attachment 48, as will be described in further detail below. In addition, the body 41 of the modular accessory connector is shaped so as to mate with a corresponding retaining slot of the mating accessory mounting attachment 48, as will be described in further detail below.

Figure 5:
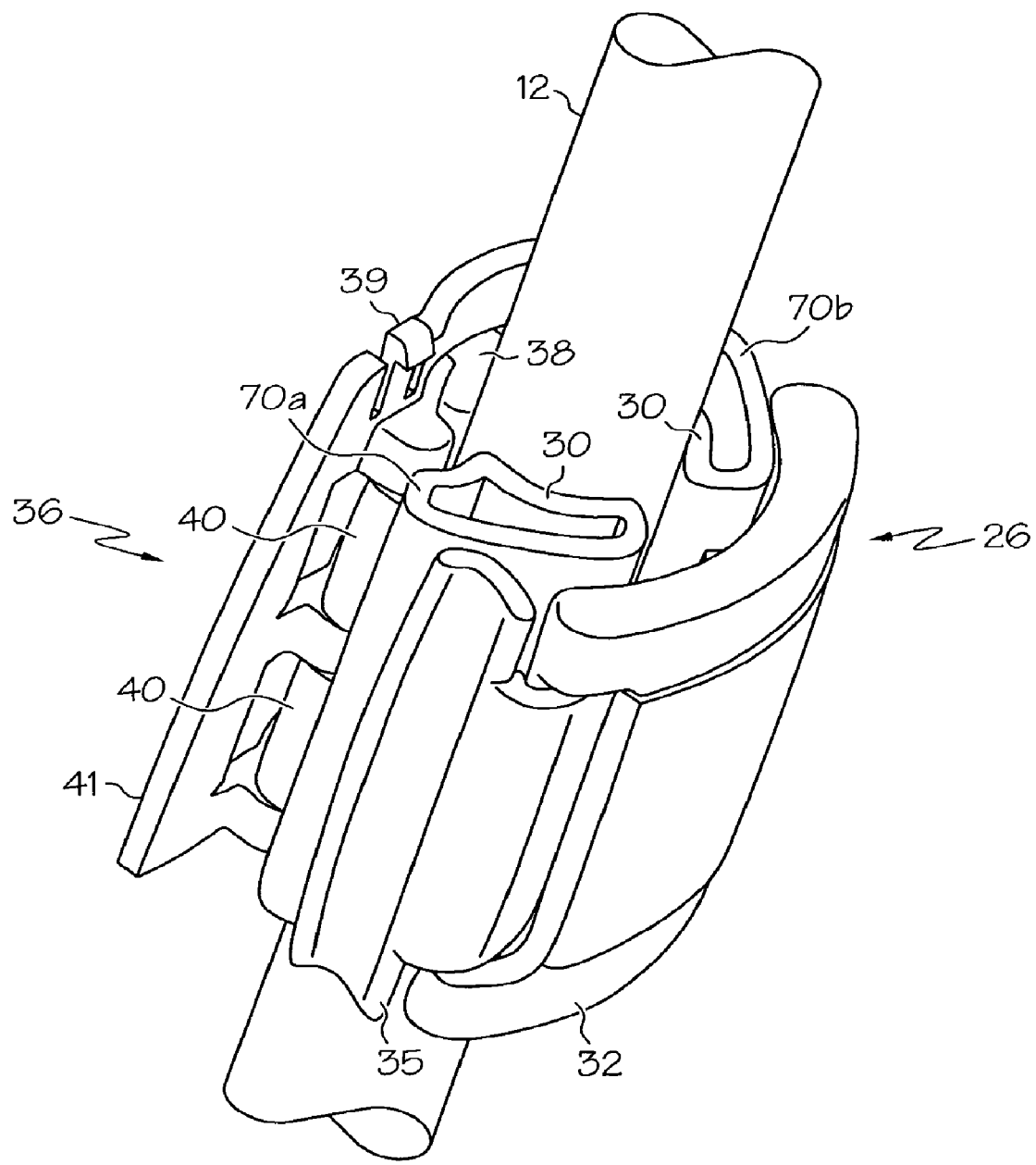
FIG. 5 is a perspective view of the clamp of FIG. 3 and the modular accessory connector of FIG. 4 mounted to a pole in accordance with the present invention.

FIG. 5 is a perspective view of the combined clamp of FIG. 3 and the modular accessory connector 36 of FIG. 4 mounted to a pole in accordance with the present invention. In this view, it can be seen that the pole interface surface 38 of the modular accessory connector and the pole interface surfaces 30 of the first and second clamp body portions 70a, 70b, are shaped, for example, curved, to match the contour, for example the cylindrical contour, of the pole 12 to which it is installed. The latch handle 32 is shown in a locked position, which pulls the first and second clamp body portions 70a, 70b toward each other to secure the clamp 26 and modular accessory connector 36 to the pole 12.

Figure 6:
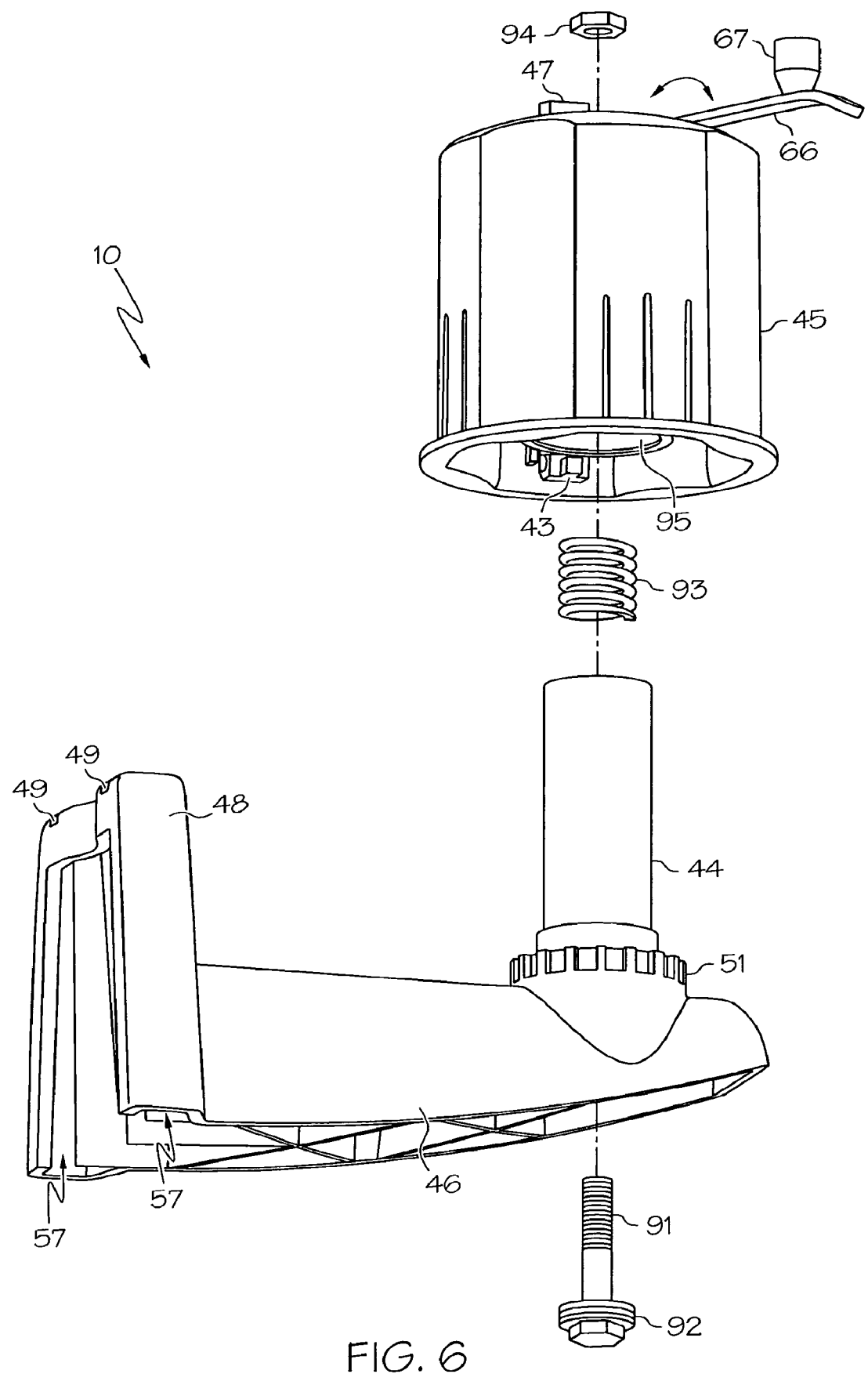
FIG. 6 is an exploded perspective view of the caution tape dispenser accessory of FIGS. 1, 2A and 2B with a modular mounting attachment feature in accordance with the present invention.

FIG. 6 is an exploded perspective view of the caution tape dispenser accessory of FIGS. 1, 2A and 2B including a modular mounting attachment 48 feature in accordance with the present invention. The modular mounting attachment 48 extends from a body portion 46 of the caution tape dispenser and includes a slot 57 that mates with the body 41 of the modular accessory connector 36 for connecting the accessory, in this example, the caution tape dispenser accessory 10, to a pole clamp, for example the clamp 26 described above in connection with FIG. 3. Retention slots 49 formed in a top portion of the slot 57 of the modular mounting attachment 48 mate with the retention hooks 39 of an inserted modular accessory connector 36, and are operative to retain the modular accessory connector 36 and the corresponding clamp 26 to the accessory.

In this embodiment, the caution tape dispenser accessory 10 includes an axle 44 that extends from the body portion 46 and on which is seated a spool 45. The spool 45 rotates about the axle 44 at a spool seat 95. An outer diameter of the spool 45 is dimensioned to receive a standard roll of caution tape that can be press fit on the spool 45, for example a standard roll having an inner diameter of 3 inches. The spool 45 is secured to the body portion 46 and axle 44 using a bolt 91, washer 92 and nut 94. An optional spring 93 can be positioned between an upper portion of the axle 44 and an inner ceiling of the spool seat 95 so that an adjustable tension can be applied to the rotation of the spool 45 relative to the body portion 46. A lock knob 47 at a top of the spool 45 controls the position of an engagement tooth 43 at a bottom, interior portion of the spool 45. The engagement tooth 43 is constructed to engage one of multiple tooth captures 51 arranged about a bottom portion of the axle 44. In one embodiment, the lock knob 47 and the engagement tooth 43 pivot relative to each other about an axle. In this manner, the rotational position of the spool can be locked relative to the body portion 46. A retractable handle 66 that pivots relative to the spool extends in a horizontal direction from the top of the spool in an active position. The handle 66 includes a knob 67 that rotates relative to the handle 66, so that the caution tape can be rapidly dispensed during installation and reeled and retained following use.

Figure 7:
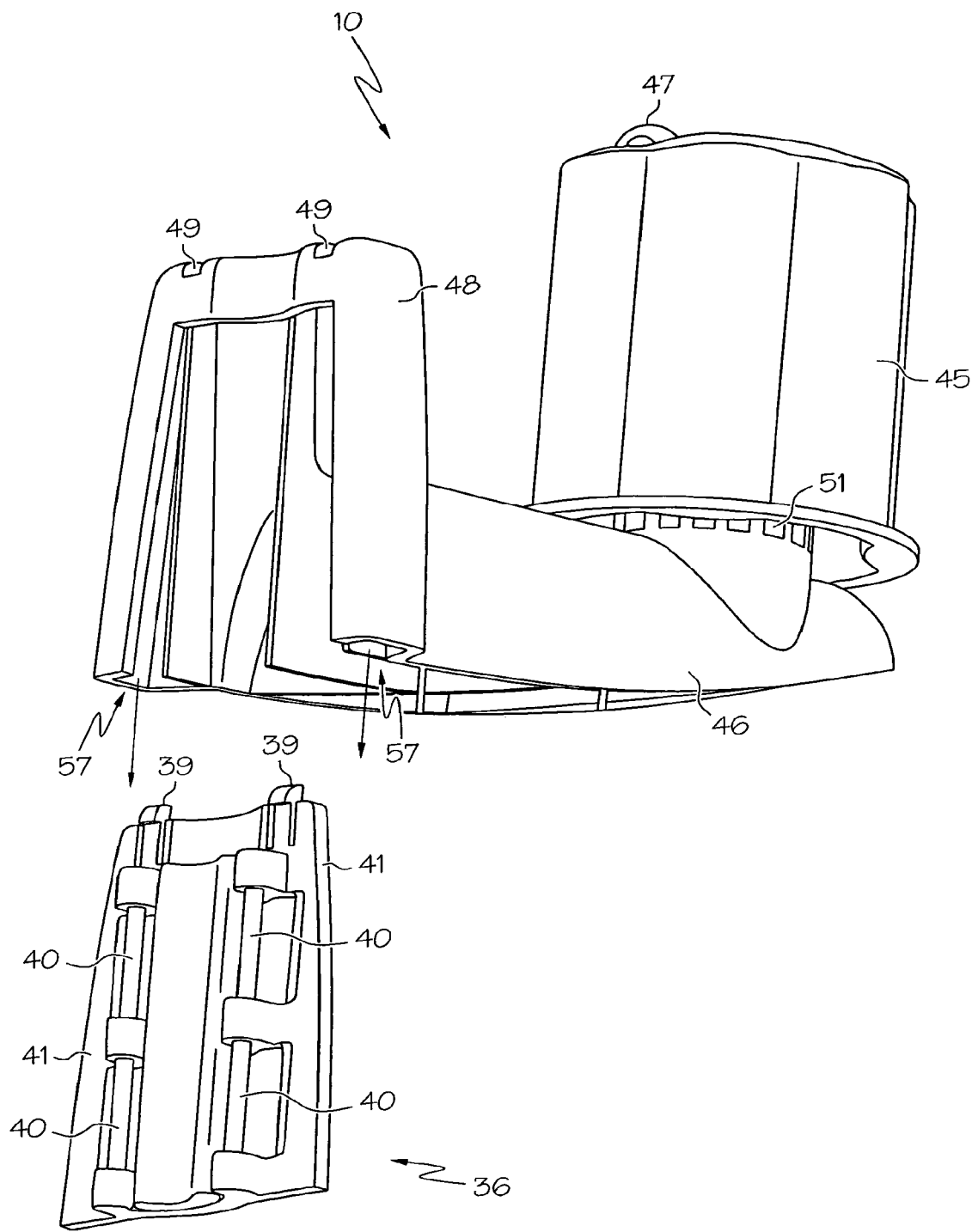
FIG. 7 is a perspective view of the caution tape dispenser accessory of FIG. 6, with the modular mounting attachment feature being coupled to the modular accessory connector of FIG. 4 in accordance with the present invention.

FIG. 7 is a perspective view of the assembled caution tape dispenser accessory 10 of FIG. 6 with the modular mounting attachment feature 48 being coupled to the modular accessory connector 36 of FIG. 4 in accordance with the present invention. The body 41 of the modular accessory connector 36 is positioned in the slot 57 of the modular mounting attachment 48 to a final, engaged position where the retention hooks 39 of the modular accessory connector 36 engage the retention slots 49 of the modular mounting attachment 48. In this manner, the modular accessory connector 36 and associated clamp 26 described above become locked together with the modular mounting attachment 48.

While an accessory in the form of a caution tape dispenser is shown and described above in connection with the present invention, accessories other than the caution tape dispenser can be employed, and are equally applicable to the present invention. For example, such accessories can include, for example, tool mounts, cable mounts, shelves, drawers, lighting mounts, laser mounts, camera mounts, hooks, and other related supports and organization aids that lead to a more visually attractive, and safer work site. The additional accessories can each be constructed and arranged to include a modular mounting attachment 48 on their bodies having the same configuration as that of the modular mounting attachment 48 of the caution tape dispenser accessory 10. In this manner, the different types of accessories can be mounted to the same type of clamp 26 and modular accessory connector 36, leading to reduced manufacturing and assembly costs.

Figure 8:
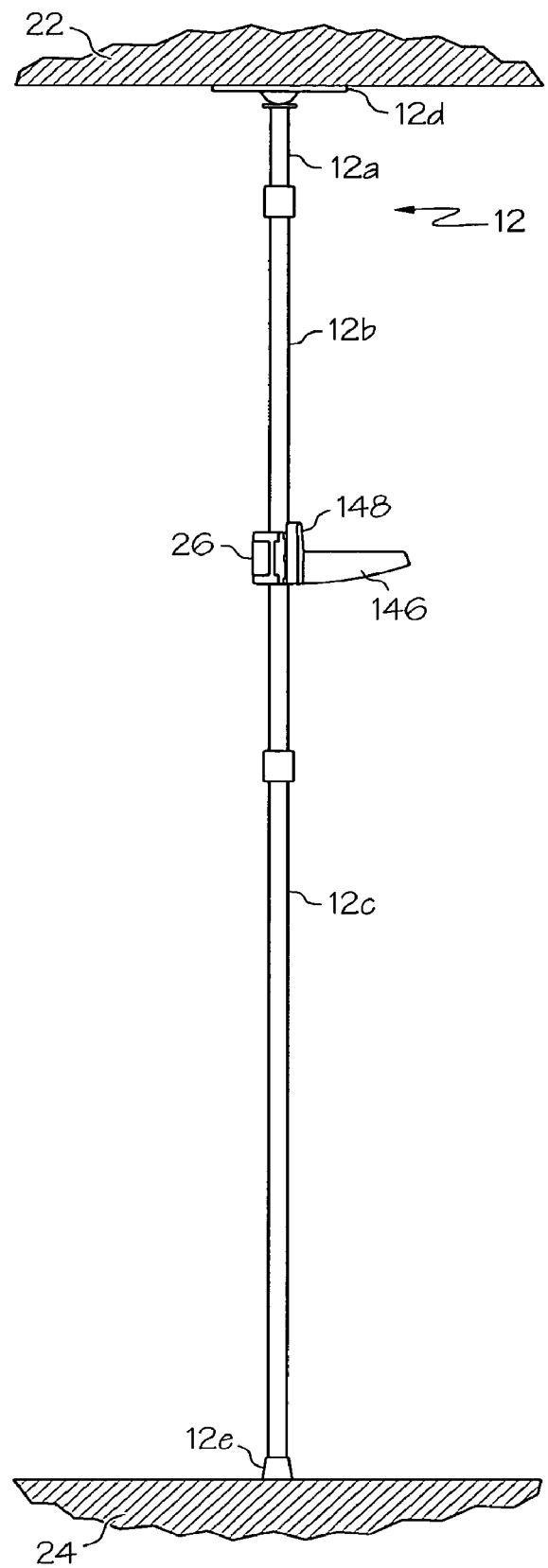
FIG. 8 is a side view of a pole having a shelf accessory mounted thereto, in accordance with the present invention.

FIG. 8 is a side view of a pole having a shelf accessory mounted thereto, in accordance with the present invention. In FIG. 8, the accessory is in the form of a flat shelf accessory 146 that includes a modular mounting attachment 148 on its body that mates with a corresponding modular accessory connector of a clamp 26, as described above. The shelf 146 may be used for storing and organizing tools or other objects.

Figure 9:
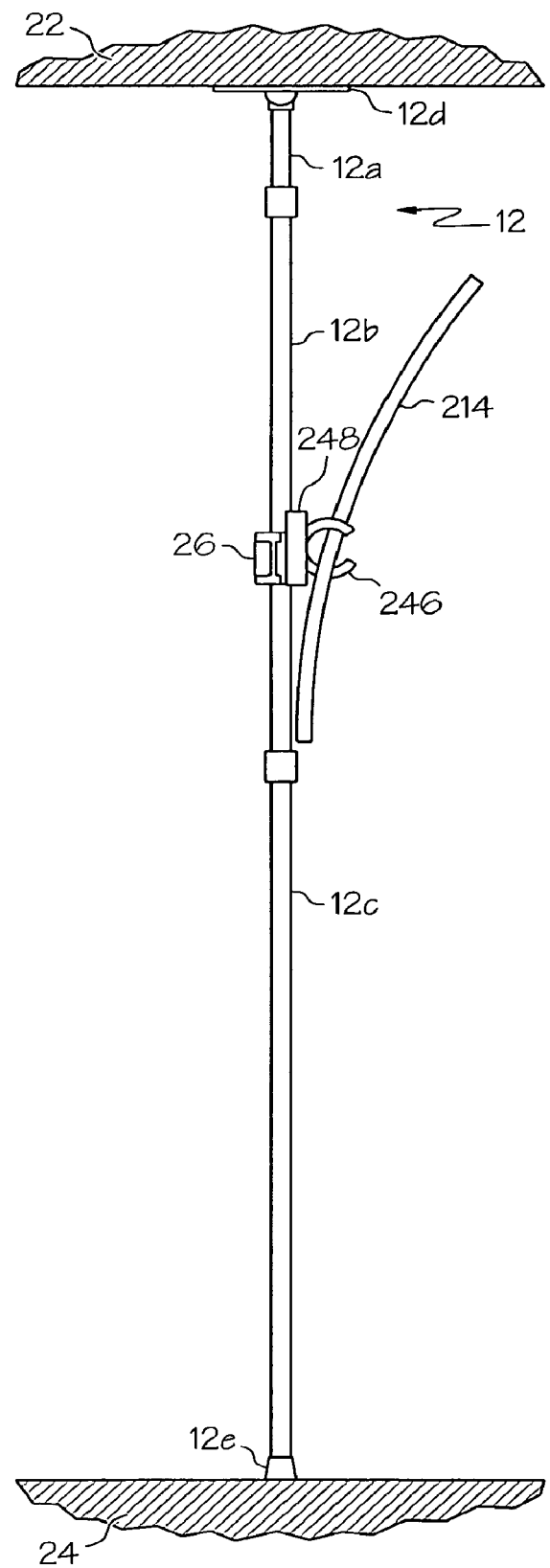
FIG. 9 is a side view of a pole having a wire clip accessory mounted thereto, in accordance with the present invention.

FIG. 9 is a side view of a pole having a wire clip accessory mounted thereto, in accordance with the present invention. In FIG. 9, the accessory is in the form of a wire clip accessory 246 that includes a modular mounting attachment 248 on its body that mates with a corresponding modular accessory connector of a clamp 26, as described above. The wire clip accessory 246 may be used for arranging and organizing power wires or cables to be used at the work site for safety or cosmetic reasons.

Figure 10:
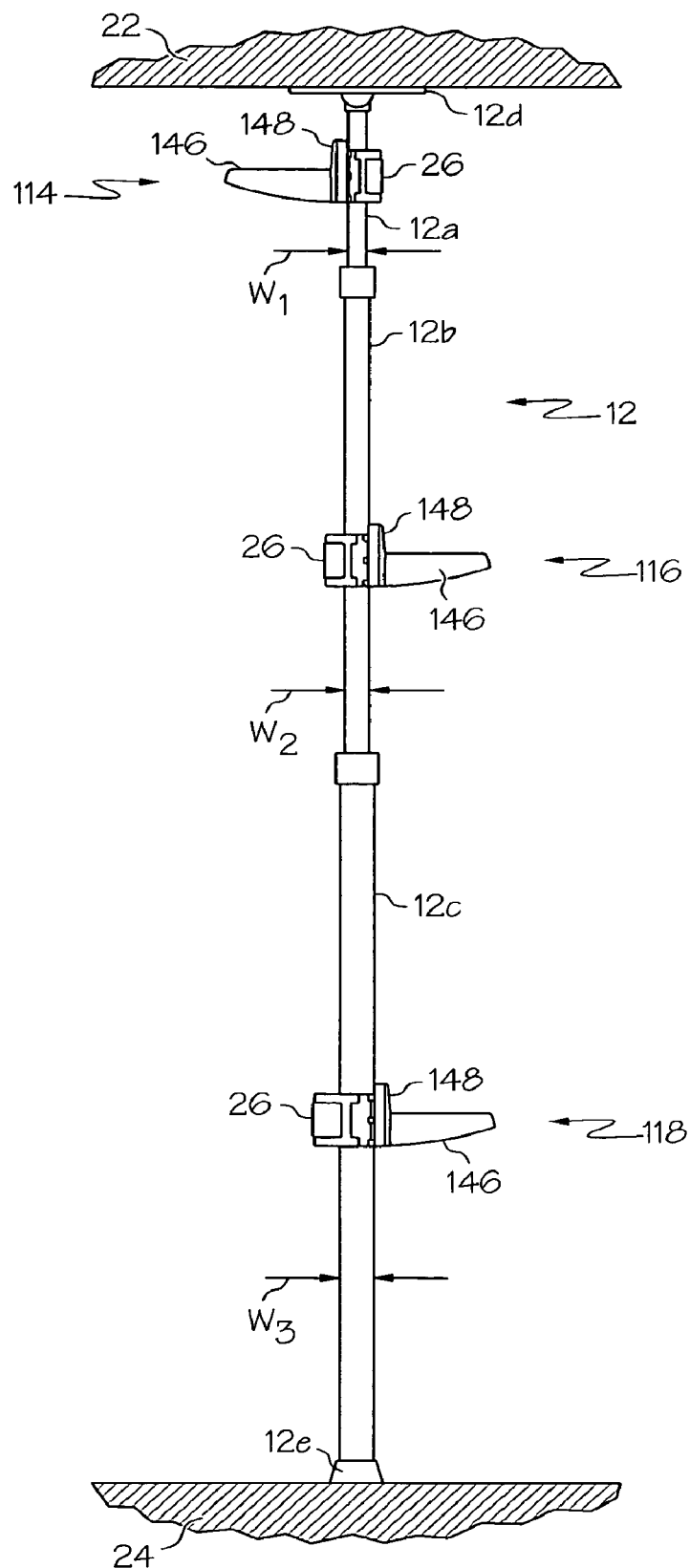
FIG. 10 is a side view of a pole having a multiple shelf accessories mounted thereto, in accordance with the present invention.

FIG. 10 is a side view of a pole having a multiple shelf accessories mounted thereto, in accordance with the present invention. In FIG. 10, multiple shelf accessories 114, 116 and 118 extend from the pole at various heights and various angular orientations. In this view, it can also be seen that although the pole sections 12a, 12b, 12c have different corresponding widths w1, w2, w3, the same clamps 26 can be used for each of the shelf accessories 146 attached to the different pole sections 12a, 12b, 12c, since the clamps 26 are adjustable in width. In addition, the clamps 26 allow for vertical and rotational positioning with respect to the pole sections 12a, 12b, 12c.

Figure 11:
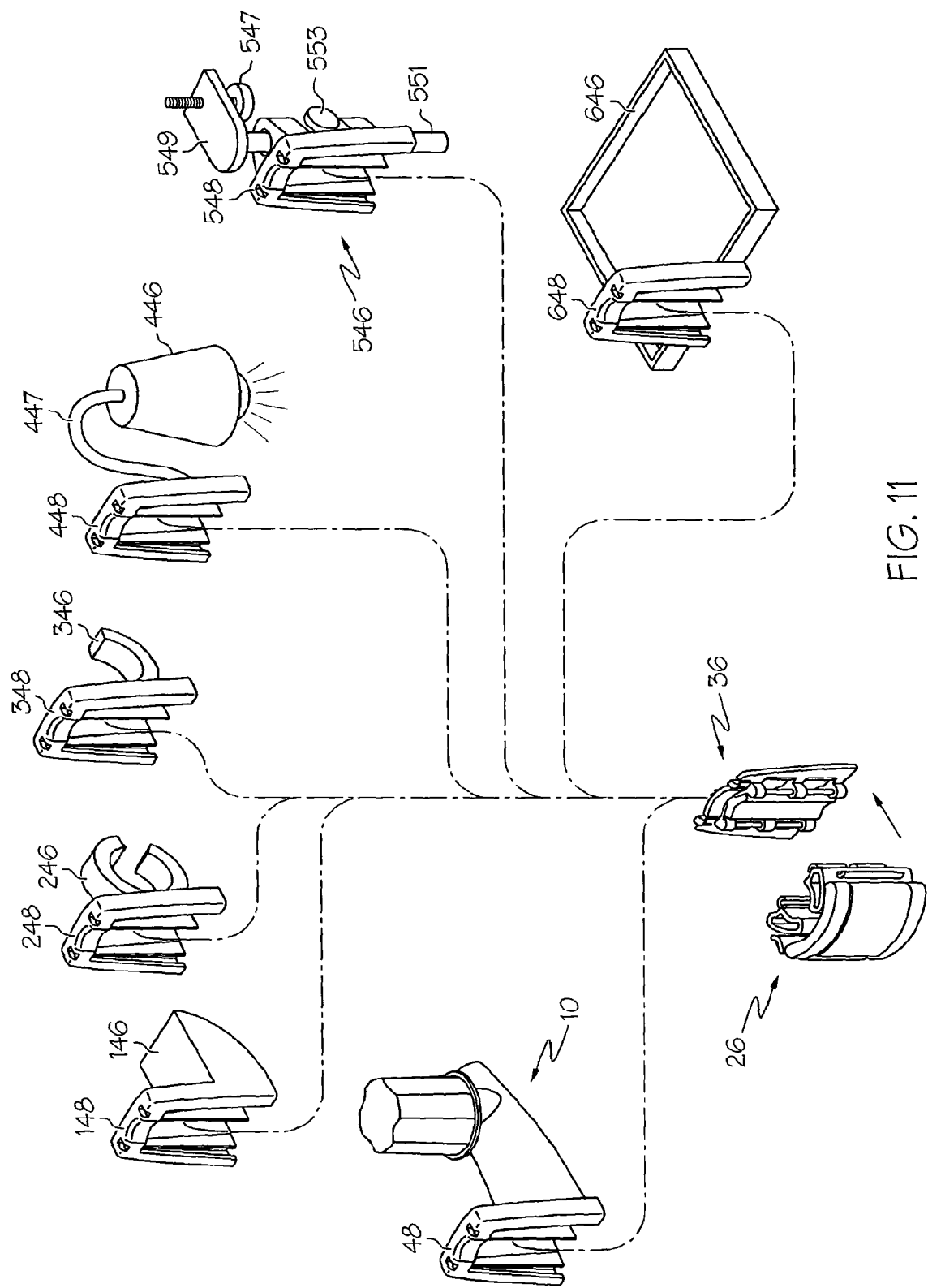
FIG. 11 is a exploded perspective illustration of a variety of modular accessories that are attachable to a same type of clamp and corresponding modular accessory connector, in accordance with the present invention.

FIG. 11 is a exploded perspective illustration of a variety of modular accessories that are attachable to a same type of clamp 26 and corresponding modular accessory connector 36, in accordance with the present invention. The various accessories include a caution tape dispenser accessory 10, a shelf accessory 146, a wire clip accessory 246, a hook accessory 346, a lighting device accessory 446, a camera or laser mount accessory 546, and a tray accessory 646. The caution tape dispenser accessory 10 is described in detail above. The shelf accessory 146 includes a flat or recessed upper surface for storage of tools, parts, or equipment. The wire clip accessory 246 includes a C-shaped, or J-shaped, opening for supporting and retaining wires or cables. The hook accessory 346 includes a hook feature on which various items, including tools, equipment, clothing, etc. can be hung. The lighting accessory 446 includes an adjustable neck 447 so that emitted light can be oriented in a range of desired directions. The laser or camera mount accessory 546 includes a camera or laser tray 549 with a standard mounting thumb screw 547 for securing the camera or laser to the tray 549. The vertical position of the tray 549 is controlled by control knob 553, which adjusts the vertical position of an arm 551 to which the tray 549 is mounted, relative to the body of the camera or laser mount accessory 546. The tray accessory 646 includes a flat or recessed upper surface for storage of tools, parts, or equipment.

In the embodiment shown in FIG. 11, each of the various accessories is equipped with a similar modular mounting attachment 48, 148, 248, 348, 448, 548, 648 that all mate with the same type of modular accessory connector 36 and corresponding clamp 26, as described above. The same configuration applies equally well to other forms of accessories that would find use at or around a work site, or any site at which temporary partition poles would be installed.

Figure 12:
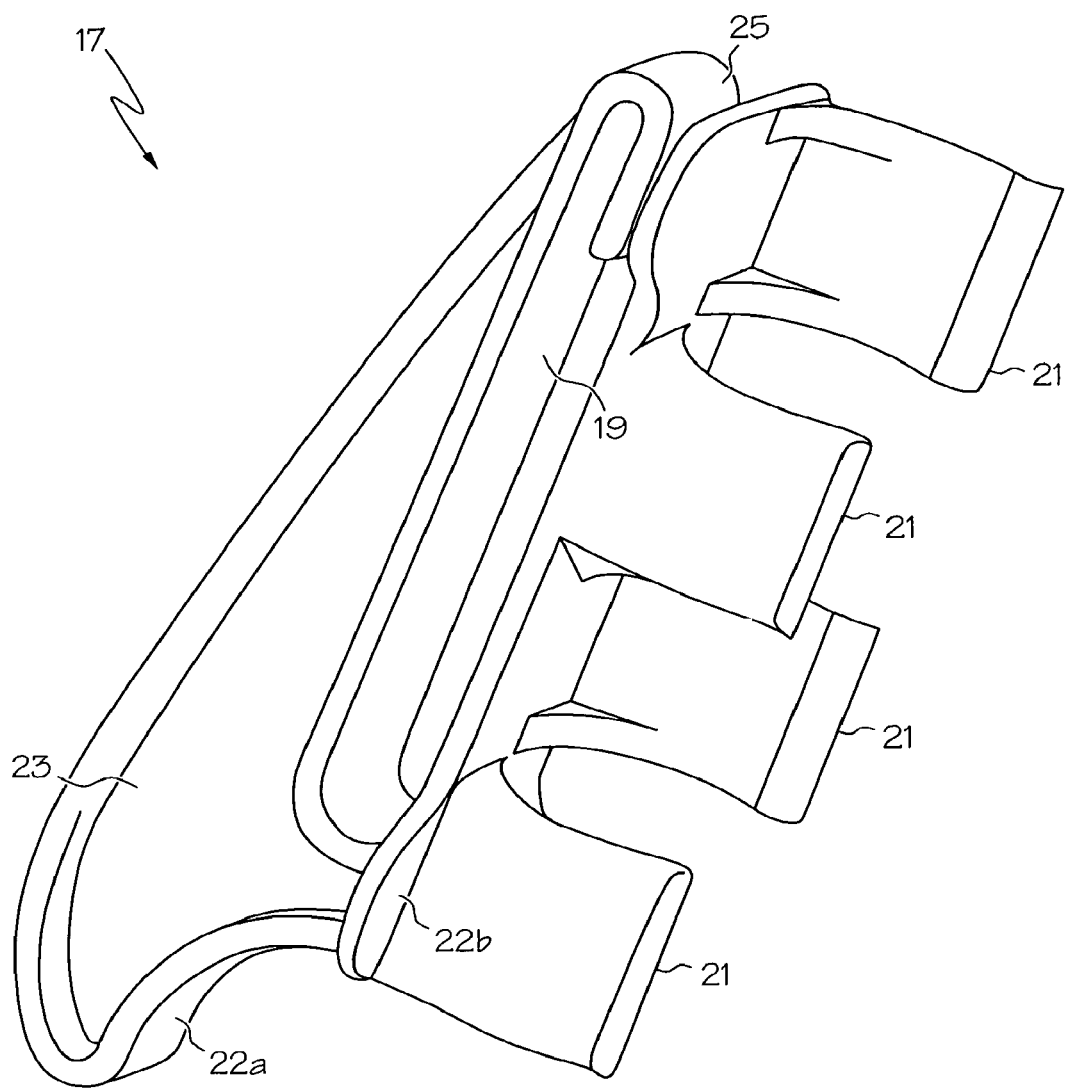
FIG. 12 is a perspective view of an embodiment of the tape guide clip of FIG. 1, in accordance with the present invention.

FIG. 12 is a perspective view of the tape guide clip of FIG. 1 in accordance with the present invention. The tape guide clip 17 includes a handle 23, a tape slot 19, a slot trap 25 and opposed clamping fingers 21. The handle 23 and the body of the clip 17 include thumb release features 22a, 22b which can be used for leverage when releasing the tape guide clip 17 from a pole. The tape slot 19 is constructed and arranged to be sufficiently wide and long so that a dispensed caution tape can slide through the tape slot 19. A slot trap 25 at the top portion of the slot 19 has a narrow opening for insertion of an edge of an caution tape and a relatively wide trap 25, so that the inserted tape becomes trapped in the slot once inserted, and requires operator assistance for removal of the tape.

Figure 13:
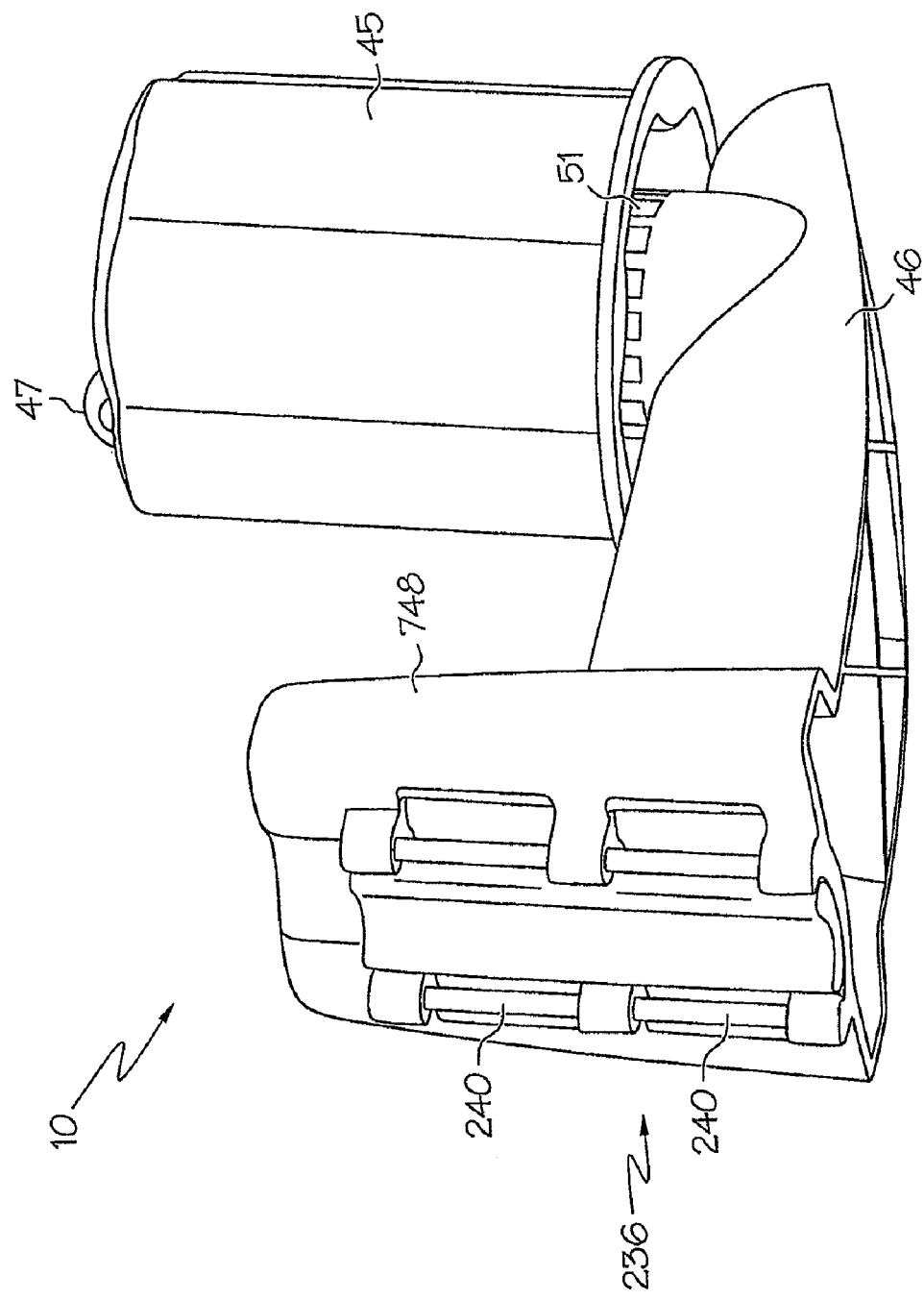
FIG. 13 is a perspective view of a caution tape dispenser assembly including an integrated modular mounting attachment feature, in accordance with the present invention.

FIG. 13 is a perspective view of a caution tape dispenser assembly including an integrated modular accessory connector 236, in accordance with the present invention. In this embodiment, the features of the accessory connector adapter are integrated directly onto a rear face 748 of the body 46 of the caution tape dispenser accessory 10. Therefore, the modular accessory connector 236 of this embodiment includes rod features 240 similar in structure to the rod features 40 described above, and mate with the pivot hook features 34a, 34b of the clamp in the same manner. Although this embodiment is illustrated in connection with the caution tape dispenser 10 accessory, the integrated modular accessory connector 236 feature can be integrated with any of the accessories illustrated above, or with other accessories.

FIGS. 14A-14E are sequential illustrations of the installation of an accessory system, including installation of a caution tape dispenser accessory, lighting accessory, shelf accessory and hook accessory, in accordance with the present invention.

With reference to FIG. 14A, an installer 200 is in the process of installing three adjustable-length poles 12, 18, 20 between a first floor surface 24 and a second ceiling surface 22 of a room. In this illustration, a ribbon, for example in the form of a caution tape, is to be installed in order to section off an area of the room near the door.

Figure 14B:
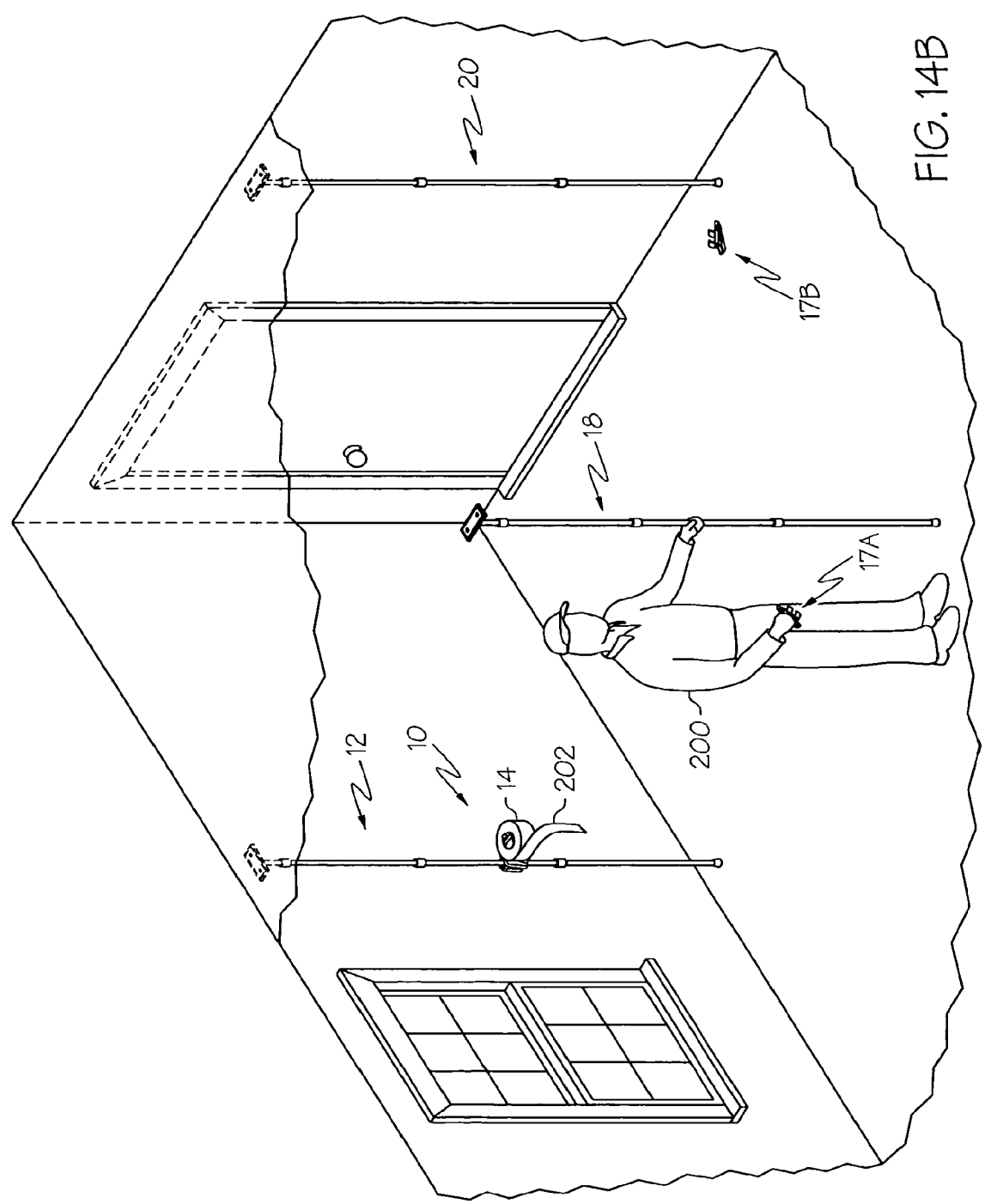

With reference to FIG. 14B, the installer 200 mounts the caution tape dispenser 10, including a roll of caution tape 14, to a side portion of the body of the first pole 12 between the first and second ends of the first pole 12. Next, the installer 200 mounts a tape guide clip 17A, for example of the type illustrated in FIG. 12 to a side portion of the body of the second pole 18, as shown.

With reference to FIG. 14C, the installer 200 next pulls caution tape from the dispenser 10, and places an edge of the dispensed caution tape 202 through the tape guide slot 19 (see FIG. 12) of the clip 17A so that the dispensed tape 202 is supported by, and slides through, the slot of the clip 17A mounted to the second pole 18.

Figure 14D:
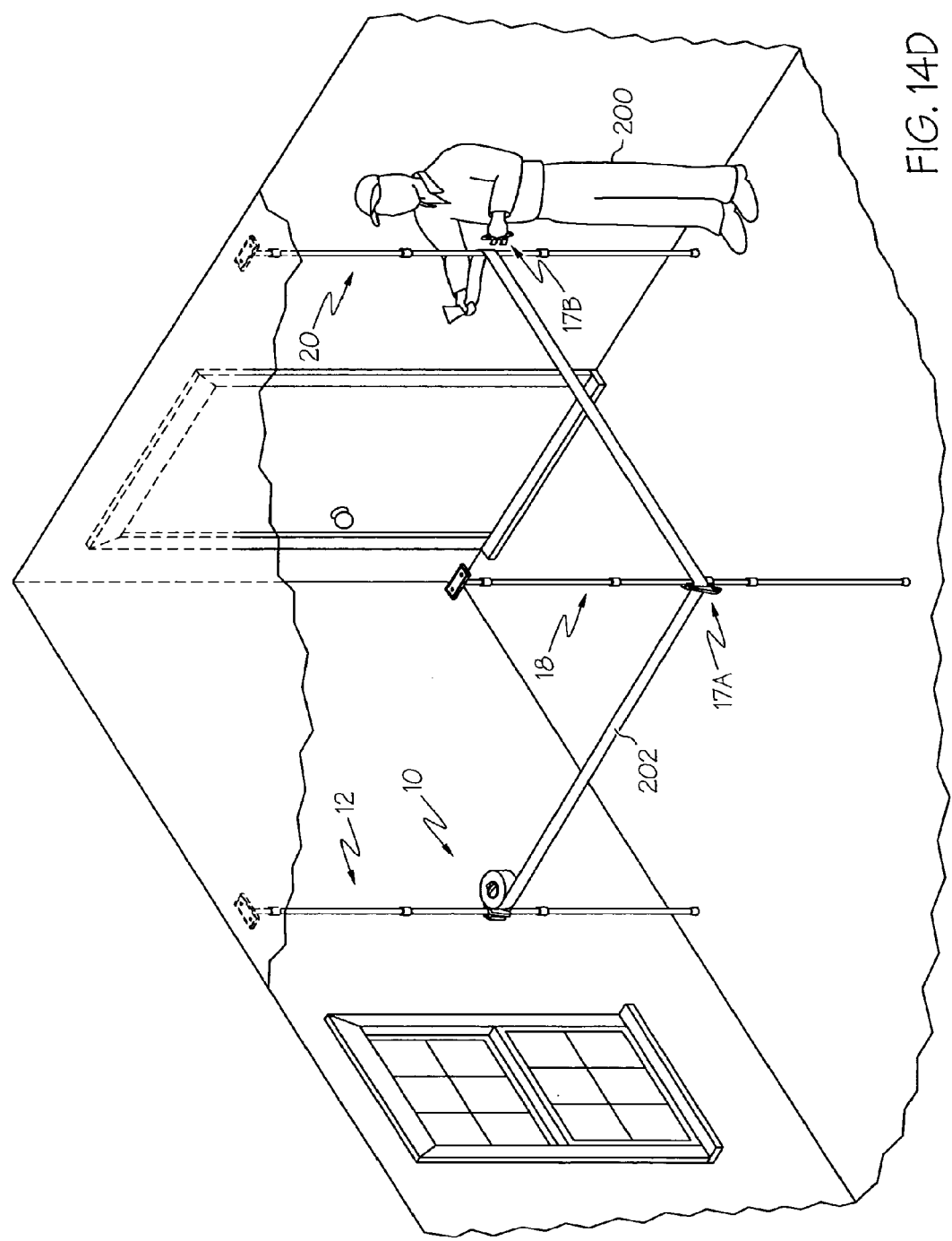

With reference to FIG. 14D, the installer 200 continues to pull additional caution tape from the dispenser 10, and clips a leading edge of the dispensed tape 202 to the third pole 20 using the opposed clamping fingers 21 of clip 17B. Following this, the installer uses the handle 66 of the caution tape dispenser accessory 10 to remove slack from the dispensed tape 202, and locks the spool of the dispenser in place using lock knob 47.

Figure 14E:
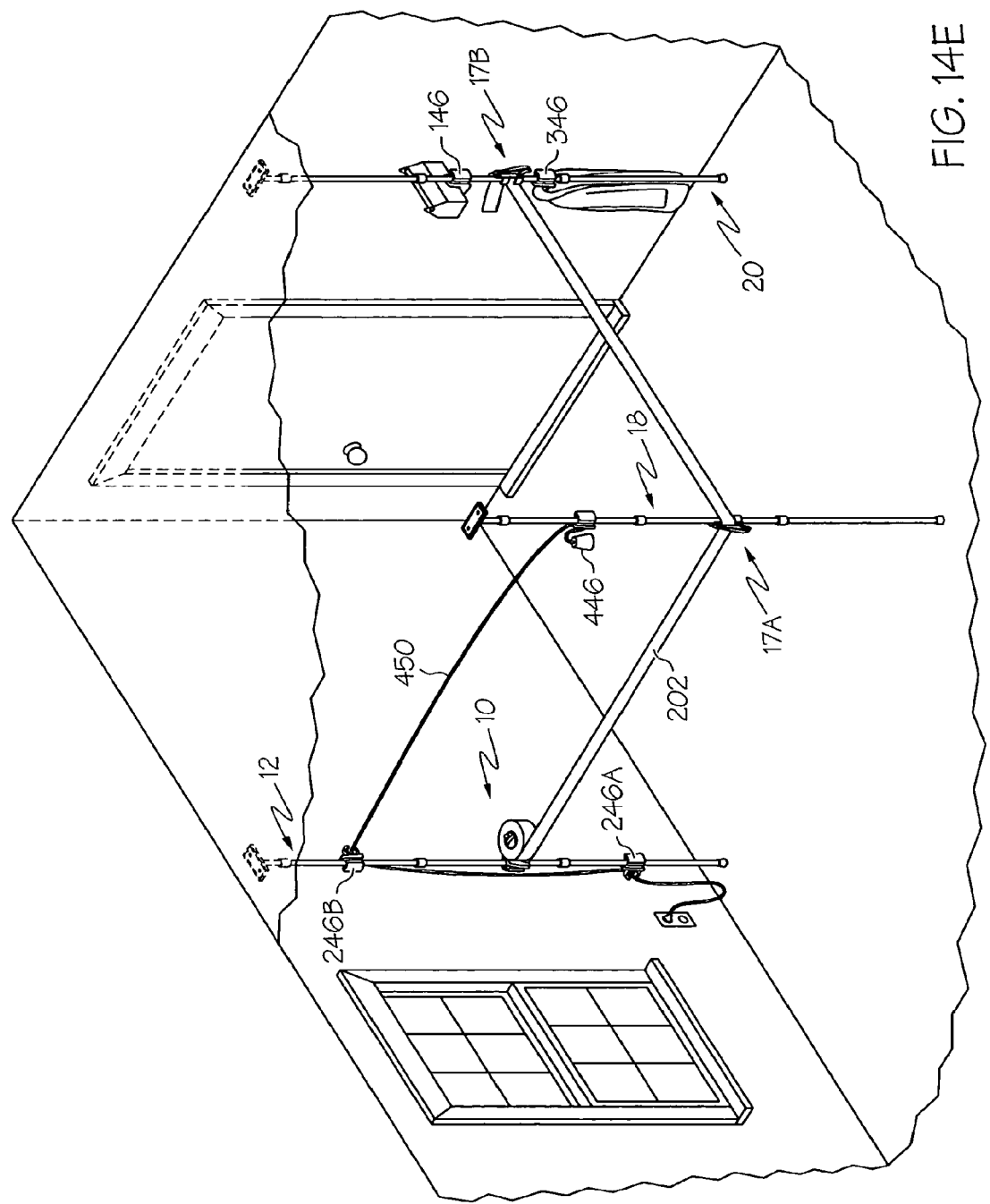

With reference to FIG. 14E, the installer 200 next organizes the work site by installing first and second wire clip accessories 246A, 246B to the first pole 12, and lighting accessory 446 to the second pole 18. An electrical wire 450 for the lighting accessory is passed through the wire clips 246A, 246B and across to the lighting accessory 446 at the second pole 18 near the ceiling, in order to provide a safer work site. In addition, a shelf accessory 146 is installed on the third pole 20 for supporting miscellaneous tools that will be needed for the project. A hook accessory 346 is also installed on the third pole 20 for further organization of items. It should be noted that the various accessories mounted to the poles 12, 18, 20 in this illustration are mounted to different lower, middle, and upper pole segments of the poles 12, 18, 20, each segment having a different width, as described above. Accordingly, by providing the accessories each with a clamp having a pole interface of an adjustable width, the accessories can be employed at any of the pole segments, leading to enhanced applicability of the systems and methods of the present invention.

The various accessories, the clamp, the modular accessory connector, and the tape guide clip, and the various components thereof, can be formed of any of a number of relatively strong and lightweight materials, including plastic, aluminum, and graphite. In one example, the parts and components are formed in a plastic injection molding process, preferably in a straight-pull injection molding process in order to reduce tooling and manufacturing costs.

The present invention is therefore directed to accessory mounting systems and mounting methods thereof that provide an effective solution for sectioning a portion of a room and for organizing tools, objects and cables involved in the activity that gives rise to the need for sectioning or organizing the room, in a manner that improves site safety, improves the visual attractiveness of a site, and improves site organization.

While this invention has been particularly shown and described with references to preferred embodiments thereof, it will be understood by those skilled in the art that various changes in form and details may be made herein without departing from the spirit and scope of the invention as defined by the appended claims.

For example, although certain embodiments described above describe the use of a caution tape dispenser for dispensing commercially available caution tape, a similar dispenser could be configured to dispense colored ribbon or rope that does not include a written warning.

What is claimed is:

1. A pole accessory mounting system, comprising:
   a laser mount having a mounting screw for securing a laser to the laser mount, the laser mount having first and second retention slots;
   an accessory adapter having first and second retention hooks that are constructed and arranged to elastically engage and fasten to the first and second retention slots of the laser mount, so that the laser mount can be removably attached to the accessory adapter, the accessory adapter having a first pole interface; and
   a hand-releasable mechanism having a second pole interface, the hand-releasable mechanism constructed and arranged to adjust a width between the first pole interface and the second pole interface.

2. The pole accessory mounting system of claim 1, wherein the accessory adapter and the hand-releasable mechanism are mountable to pole sections of a pole that have different widths.

3. The pole accessory mounting system of claim 2, wherein the width between the first pole interface and the second pole interface is adjustable to at least three different widths.

4. The pole accessory mounting system of claim 1, wherein the hand-releasable mechanism is constructed and arranged to secure the accessory adapter and the hand-releasable mechanism to a side portion of a pole.

5. The pole accessory mounting system of claim 1, wherein the hand-releasable mechanism is constructed and arranged to secure the accessory adapter and the hand-releasable mechanism to a side portion of a pole, so that it is not necessary to install the accessory adapter and the hand-releasable mechanism at or over an end portion of the pole.

6. The pole accessory mounting system of claim 1, wherein the accessory adapter comprises a body portion that includes the first pole interface, and wherein the first and second retention hooks extend outward from the body portion.

7. The pole accessory mounting system of claim 6, wherein the first and second retention hooks extend parallel to one another.

8. The pole accessory mounting system of claim 1, wherein the hand-releasable mechanism is mountable to a body portion of a pole, and wherein the body portion of the pole comprises a circular cross-section.

9. The pole accessory mounting system of claim 1, wherein the first pole interface comprises a curved pole interface.

10. The pole accessory mounting system of claim 1, wherein the second pole interface comprises a curved pole interface.

11. The pole accessory mounting system of claim 1, wherein the first pole interface comprises a first pad.

12. The pole accessory mounting system of claim 11, wherein the first pad comprises a non-skid material.

13. The pole accessory mounting system of claim 11, wherein the first pad comprises a compressible material.

14. The pole accessory mounting system of claim 1, wherein the second pole interface comprises a second pad.

15. The pole accessory mounting system of claim 14, wherein the second pad comprises a non-skid material.

16. The pole accessory mounting system of claim 14, wherein the second pad comprises a compressible material.

17. The pole accessory mounting system of claim 1, wherein the mounting screw comprises a thumb screw.

18. The pole accessory mounting system of claim 1 further comprising a pole having multiple telescoping segments of different outer widths.

19. The pole accessory mounting system of claim 18, wherein the pole comprises a biasing mechanism between a first end and a second end of the pole that biases the first end in a direction away from the second end.

20. A pole accessory mounting system, comprising:
    a laser mount having a mounting screw for securing a laser to the laser mount, the laser mount having first and second retention slots;
    an accessory adapter having first and second retention hooks that are constructed and arranged to engage the first and second retention slots of the laser mount, so that the laser mount can be removably attached to the accessory adapter, the accessory adapter having a first pole interface; and
    a hand-releasable mechanism having a second pole interface, the hand-releasable mechanism constructed and arranged to adjust a width between the first pole interface and the second pole interface by permitting the first and second pole interfaces to pivot relative to each other, wherein the hand-releasable clamp includes a latching arm that extends from the hand-releasable mechanism, the latching arm including an engagement feature, and wherein said second pole interface of the hand-releasable mechanism includes multiple engagement tabs, the width between the first pole interface and the second pole interface being adjustable according to the one of the multiple engagement tabs that is engaged with the engagement feature.

* * * * *